United States Patent [19]
Bahel et al.

[11] Patent Number: 5,628,201
[45] Date of Patent: May 13, 1997

[54] HEATING AND COOLING SYSTEM WITH VARIABLE CAPACITY COMPRESSOR

[75] Inventors: Vijay Bahel, Sydney; Hank Millet, Piqua; Mickey Hickey, Sidney; Hung Pham, Dayton; Gregory P. Herroon, Piqua; Gerald L. Greschl, Dayton, all of Ohio

[73] Assignee: Copeland Corporation, Sidney, Ohio

[21] Appl. No.: 415,640

[22] Filed: Apr. 3, 1995

[51] Int. Cl.⁶ .................................................... F25B 41/04
[52] U.S. Cl. ............................. 62/211; 62/223; 62/228.4
[58] Field of Search .............................. 62/211, 223, 210, 62/204, 228.1, 228.4, 228.5

[56] References Cited

U.S. PATENT DOCUMENTS

| | | |
|---|---|---|
| 2,978,879 | 6/1961 | Heidorn . |
| 3,047,696 | 12/1962 | Heidorn . |
| 3,107,843 | 10/1963 | Finn . |
| 3,276,220 | 10/1966 | Miner . |
| 3,278,111 | 10/1966 | Parker . |
| 3,384,801 | 5/1968 | Rodgers . |
| 3,729,949 | 5/1973 | Talbot . |
| 3,998,068 | 12/1976 | Chirnside . |
| 4,007,605 | 2/1977 | Denny . |
| 4,112,703 | 9/1978 | Kountz . |
| 4,165,619 | 8/1979 | Girard . |
| 4,220,010 | 9/1980 | Mueller et al. . |
| 4,236,379 | 12/1980 | Mueller . |
| 4,244,182 | 1/1981 | Behr . |
| 4,315,413 | 2/1982 | Baker . |
| 4,328,678 | 5/1982 | Kono et al. . |
| 4,333,317 | 6/1982 | Sawyer . |
| 4,338,791 | 7/1982 | Stamp et al. . |
| 4,448,038 | 5/1984 | Barbier . |
| 4,449,375 | 5/1984 | Briccetti . |
| 4,467,613 | 8/1984 | Behr et al. . |
| 4,495,779 | 1/1985 | Tanaka et al. . |
| 4,498,310 | 2/1985 | Imanishi et al. . |
| 4,499,739 | 2/1985 | Matsuoka et al. . |
| 4,507,936 | 4/1985 | Yoshino . |
| 4,510,576 | 4/1985 | MacArthur et al. . |
| 4,523,435 | 6/1985 | Lord . |
| 4,523,436 | 6/1985 | Schedel et al. . |
| 4,611,470 | 9/1986 | Enström . |
| 4,612,775 | 9/1986 | Branz et al. . |
| 4,617,804 | 10/1986 | Fukushima et al. . |
| 4,620,424 | 11/1986 | Tanaka et al. . |
| 4,674,292 | 6/1987 | Ohya et al. . |
| 4,677,830 | 7/1987 | Sumikawa et al. . |
| 4,686,835 | 8/1987 | Alsenz ................................. 62/211 X |
| 4,706,469 | 11/1987 | Oguni et al. . |
| 4,745,765 | 5/1988 | Pettitt . |
| 4,745,767 | 5/1988 | Ohya et al. . |
| 4,768,348 | 9/1988 | Noguchi . |
| 4,807,445 | 2/1989 | Matsuoka et al. . |
| 4,835,980 | 6/1989 | Oyanagi et al. . |
| 4,845,956 | 7/1989 | Bernsten et al. . |
| 4,848,099 | 7/1989 | Beckey et al. . |
| 4,848,100 | 7/1989 | Barthel et al. . |
| 4,893,480 | 1/1990 | Matsui et al. . |
| 4,939,910 | 7/1990 | Umezu et al. . |

(List continued on next page.)

OTHER PUBLICATIONS

H. Itoh, "Improvement of a Heart Pump Room Air-Conditioner by User of Pulse-Motor-Driven Expansion Valve," Technical Paper No. 2944, pp. 164–172.

*Primary Examiner*—Harry B. Tanner
*Attorney, Agent, or Firm*—Harness, Dickey & Pierce, P.L.C.

[57] ABSTRACT

Compressor discharge temperature, ambient outdoor air temperature and thermal load are used as control parameters for controlling the expansion valve setting and the indoor fan speed. In a variable capacity system the thermal load parameter also controls the compressor capacity. Thermal load is measured by an integrating procedure that increments or decrements an accumulated demand counter value used as an indication of thermal load on the system. The counter value is incremented and decremented based on the room temperature and thermostat setpoint. These same parameters are also used in the overcharge/undercharge diagnostic system.

9 Claims, 19 Drawing Sheets

U.S. PATENT DOCUMENTS

| | | |
|---|---|---|
| 5,000,009 | 3/1991 | Clanin . |
| 5,036,676 | 8/1991 | Dudley . |
| 5,040,377 | 8/1991 | Braun et al. . |
| 5,050,394 | 9/1991 | Dudley et al. . |
| 5,052,186 | 10/1991 | Dudley et al. . |
| 5,054,294 | 10/1991 | Dudley . |
| 5,062,276 | 11/1991 | Dudley . |
| 5,065,593 | 11/1991 | Dudley et al. . |
| 5,077,983 | 1/1992 | Dudley . |
| 5,081,846 | 1/1992 | Dudley et al. . |
| 5,144,812 | 9/1992 | Mills, Jr. et al. . |
| 5,181,392 | 1/1993 | Itoh et al. . |
| 5,233,841 | 8/1993 | Jyrek ................... 62/223 X |
| 5,241,833 | 9/1993 | Ohkoshi ................ 62/126 |
| 5,247,805 | 9/1993 | Dennis . |
| 5,284,026 | 2/1994 | Powell . |
| 5,291,745 | 3/1994 | Hanson . |
| 5,303,561 | 4/1994 | Bahel et al. . |
| 5,311,748 | 5/1994 | Bahel et al. ............. 62/211 X |
| 5,425,246 | 6/1995 | Bessler ................... 62/223 X |

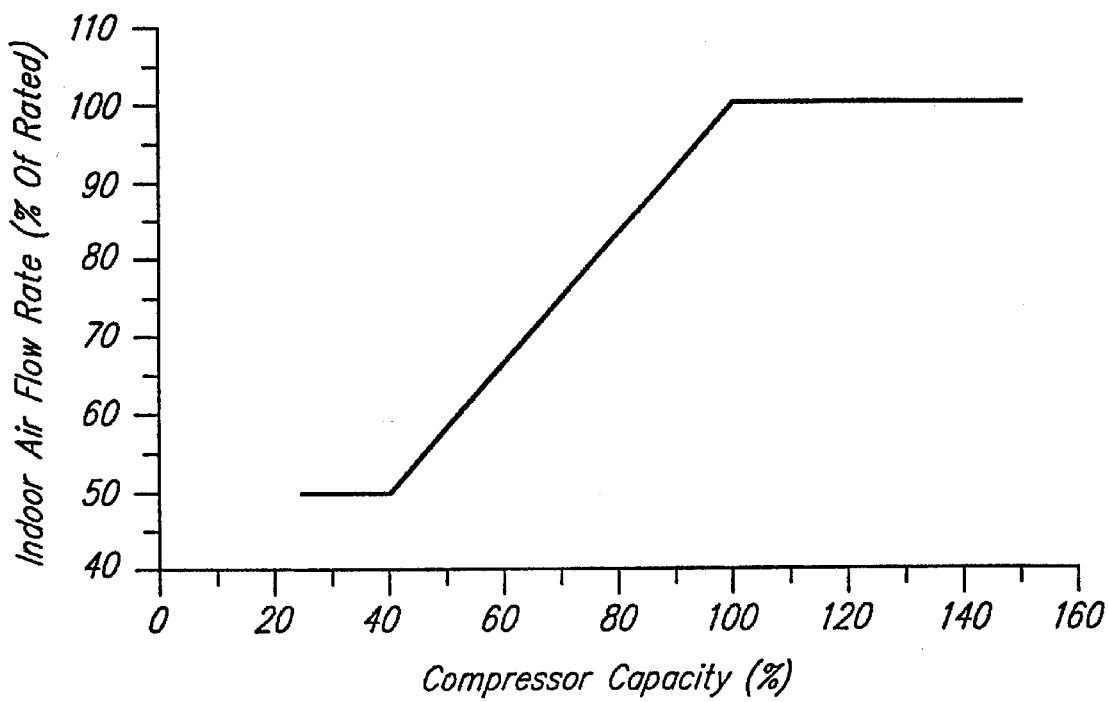
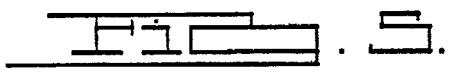
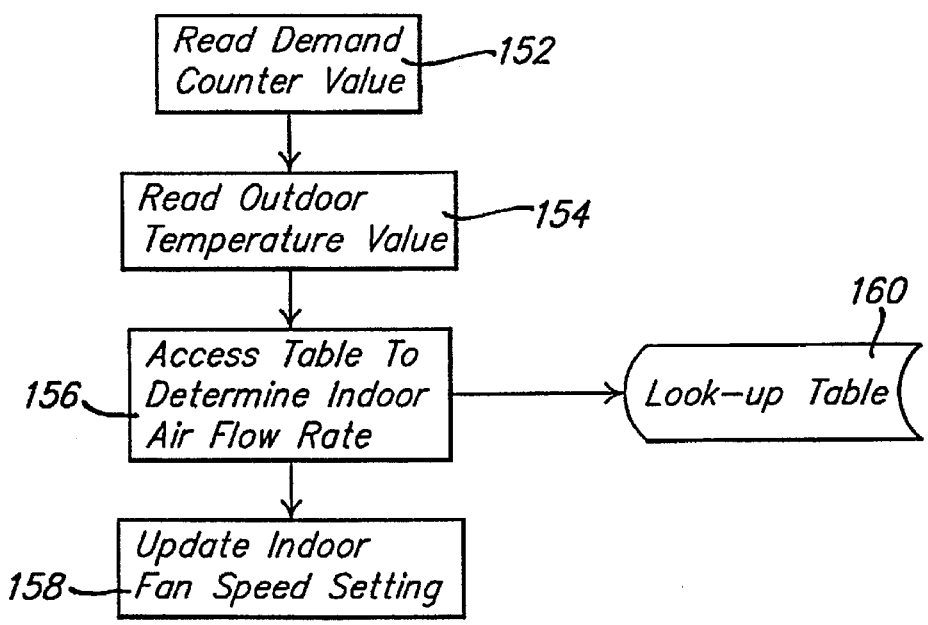
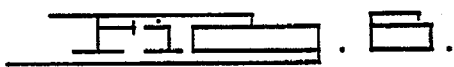

HEATING AND COOLING SYSTEM WITH VARIABLE CAPACITY COMPRESSOR

BACKGROUND AND SUMMARY OF THE INVENTION

The present invention relates generally to heat pumps, air conditioning and refrigeration equipment. More specifically, the invention relates to a control system for regulating the flow of refrigerant in a system having a variable capacity or variable speed compressor.

The Applicants' assignee has developed a control system for heat pumps that has a decoupled sensor arrangement in which refrigerant is metered through the refrigeration system, based on compressor discharge temperature and ambient air temperature measurements. The sensors are decoupled in that the ambient air temperature and compressor discharge temperature are largely independent of one another. For further information, see U.S. Pat. No. 5,311,748 to Bahel et al., entitled "Control System for Heat Pump Having Decoupled Sensor Arrangement," issued May 17, 1994.

The Applicants' assignee has also developed a control system in which the indoor airflow rate is controlled by a humidity-responsive adjustable speed fan. The control system strives to select the fan speed for optimal operating efficiency and improved occupant comfort. For further details see U.S. Pat. No. 5,303,561 to Bahel et al. entitled "Control System for Heat Pump Having Humidity Responsive Variable Speed Fan," issued Apr. 19, 1994.

The Applicants' assignee has also developed a refrigerant charge detection system or diagnostic system that detects improper amounts of refrigerant (overcharge and undercharge). For further details see U.S. patent application Ser. No. 08/095,897 to Bahel et al. entitled "Overcharge—Undercharge Diagnostic System for Air-Conditioner Controller," filed Jul. 21, 1993.

Industry demand for improved efficiency has caused many heating and cooling system developers to experiment with variable speed compressors and variable capacity systems. In a variable speed or variable capacity system refrigerant flow is controlled, at least in part, by changing the speed at which the compressor operates. Contrast this with fixed speed or fixed capacity systems in which refrigerant flow is regulated only by an adjustable restricted orifice, such as an electrically adjustable expansion valve.

The present invention strives to integrate the advantages of Applicant's assignee's prior systems with the advantages of variable speed and variable capacity systems. According to one aspect of the Applicant's invention, the expansion valve is controlled based on ambient air temperature and compressor discharge temperature measurements, taking into account the current operating capacity of the compressor. The operating capacity of the compressor is, in turn, dynamically controlled based on indoor ambient temperature and based on the load or demand that is dictated by the thermostat setpoint.

According to another aspect of the invention the speed of the indoor fan or blower is adjusted based on outdoor ambient temperature measurements, taking into account the current operating capacity of the compressor.

In yet another aspect of the invention a charge detection diagnostic system evaluates whether the system is overcharged or undercharged, based on outdoor ambient temperature and compressor discharge temperature measurements, taking into account the current operating capacity of the compressor. The diagnostic system automatically controls the expansion valve setting prior to making the charge detection decision. The current compressor capacity dictates which of a series of discharge temperature/outdoor temperature relationships is used to make the charge detection decision.

Through the enhancements and features described herein, the Applicants' invention achieves a high degree of control over the refrigeration cycle, as well as greatly improving occupant comfort and convenience. For a more complete understanding of the objects and advantages of the invention, reference may be had to the following specification and to the accompanying drawings.

BRIEF DESCRIPTION OF THE DRAWINGS

FIG. 5 is a graph showing the relationship between indoor airflow rate and compressor capacity;

FIG. 6 is a flowchart showing the indoor fan speed control procedure;

DESCRIPTION OF THE PREFERRED EMBODIMENT

1. Hardware System Description

Figure 1:
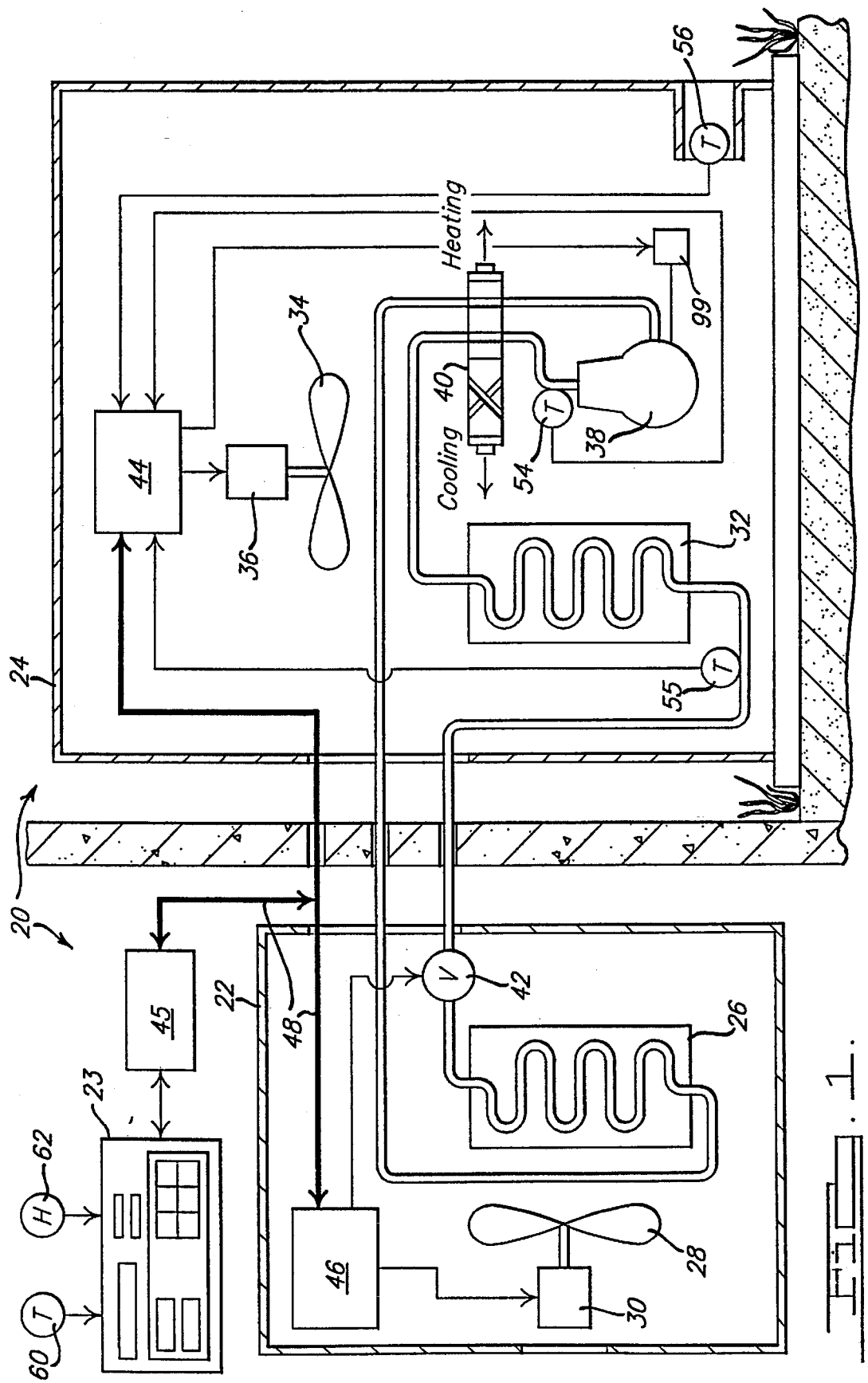
FIG. 1 is a schematic representation of a system illustrating a heat pump having selectable heating and cooling modes.

The presently preferred heat pump system is illustrated schematically in FIG. 1. In FIG. 1 the heat pump system is depicted generally at 20. Unless otherwise stated, the term heat pump, as used herein, refers generally to any pumped refrigerant heating and cooling system, including air conditioning systems. The illustrated embodiment in FIG. 1 is able to pump heat into the building (heating mode) and out from the building (cooling mode). Although both modes are illustrated, the principles of the invention apply to systems which operate in only one mode.

Heat pump system 20 includes an indoor unit 22 and an outdoor unit 24. The indoor unit includes an indoor coil or heat exchanger 26 and an indoor fan or blower 28. The indoor fan is preferably driven by a variable speed motor 30, such as a brushless permanent magnet motor. The indoor fan and coil are enclosed in a suitable cabinet so that the fan forces ambient indoor air across the indoor coil at a rate determined by the speed of the variable speed motor.

The outdoor unit includes an outdoor coil for heat exchanger 32 and an outdoor fan 34 driven by suitable motor 36. Preferably the outdoor unit includes a protective housing which encases the outdoor coil and the outdoor fan, so that the outdoor fan draws ambient outdoor air across the outdoor coil to improve heat transfer. The outdoor unit also houses compressor 38. Compressor 38 may be a variable capacity compressor. In one embodiment the compressor is a two-speed compressor, capable at operating at two capacities (e.g., 50% capacity and 100% capacity). Alternatively, multiple compressors may be used in tandem to achieve variable capacity. For example, a two ton compressor and a three ton compressor may be used in tandem to achieve three discrete capacities, namely two ton, three ton and five ton. Alternatively, a continuously variable speed compressor may be used. The continuously variable speed compressor may be operated at different speeds by changing the AC blind current frequency (e.g., 40 Hertz to 90 Hertz to 120 Hertz).

As noted above, the illustrated embodiment can be used for both heating and cooling. This is accomplished by the four-way reversing valve 40, which can be selectively set to the COOLING position or the HEATING position to control the direction of refrigerant flow. In FIG. 1 the COOLING position has been illustrated. In the COOLING position, the indoor coil functions as the evaporator coil and the outdoor coil functions as the condenser coil. When valve 40 is switched to the HEATING position (the alternate position), the functions of coils 26 and 32 are reversed. In the HEATING position the indoor coil functions as the condenser and the outdoor coil functions as the evaporator.

The heat pump system further includes an electronically controllable expansion valve 42. In the presently preferred embodiment, the expansion valve is a continuously variable (or incrementally variable) stepper motor valve which can be adjusted electronically to a wide range of orifice sizes or valve openings, ranging from fully opened to fully closed. Although it is possible to implement the control system of the invention with other types of valves, pulse width modulated valves being an example, the present embodiment prefers the stepper motor valve because it provides ripple-free operation. The stepper motor valve only needs to move or cycle when an orifice size adjustment is made. This may happen several times during a typical operating sequence (e.g., several times per hour). In contrast, the pulse width modulated valve cycles continuously during the entire operating sequence.

The preferred embodiment is constructed as a microprocessor-based distributed architecture, employing multiple control units. These control units include an outdoor control unit 44, a room control unit 45 and an indoor control unit 46. The control units are connected via serial communication link 48. Room control unit 45 is coupled to thermostat 23, and may optionally be integrated into the thermostat housing.

The presently preferred system employs a plurality of sensors which will now be described in connection with FIG. 1. The outdoor unit 24 includes compressor discharge temperature sensor 54, outdoor coil sensor 55 and outdoor ambient air temperature sensor 56. As illustrated, sensor 56 is positioned so that it is shielded from direct sun, but so that it is in the airflow path generated by fan 34. Sensors 54, 55 and 56 are coup led to the outdoor control unit 44. Thermostat 23 includes an indoor temperature sensor 60 and an indoor humidity sensor Readings from sensors 60 and 62 are supplied to room control unit 45.

According to the distributed architecture, the microprocessor-based control system assigns different tasks to each of the control units. Outdoor control unit 44 is responsible for collecting sensor readings from sensors 54–56 and for communicating those readings to indoor control unit 46. Outdoor control unit 44 supplies control signals for operating the outdoor fan 34 and also for controlling the contactor 99, which in turn supplies AC power to the compressor.

Room control unit 45 collects indoor temperature and humidity data from thermostat 23 and supplies this data to the indoor control unit 46. Room control unit 45 also supplies data to the thermostat for displaying temperature readings and messages on the thermostat display. The thermostat may include a liquid crystal display, or the like, for this purpose.

Indoor unit 46 receives the sensor readings from control units 44 and 45, and provides control signals to the indoor fan 28 and to the expansion valve 42.

2. Compressor Capacity Control

In the variable capacity system according to the invention, the operating capacity of the compressor is regulated based on demand or load. The present system derives load information from the indoor temperature sensor 60 and from the thermostat setpoint setting (the desired temperature set by the occupant). This information is communicated to the room control unit 45 and then to the indoor control unit 46. The indoor control unit determines the proper operating capacity and sends this information to the outdoor control unit 44, which controls the actual operating capacity of the compressor. In a multispeed compressor system, or in a tandem compressor system, the outdoor control unit 44 selects the proper operating speed or energizes the proper tandem compressors. In a continuously variable speed system the outdoor control unit supplies a data signal to the frequency generator or inverter, causing the appropriate AC line frequency to be supplied to the compressor.

The presently preferred embodiment uses a demand counter procedure for determining the demand or load on the system. The demand counter procedure can be executed by the microprocessor of the room control unit 45, or alternatively by the microprocessor of the indoor control unit 46.

Figure 2:
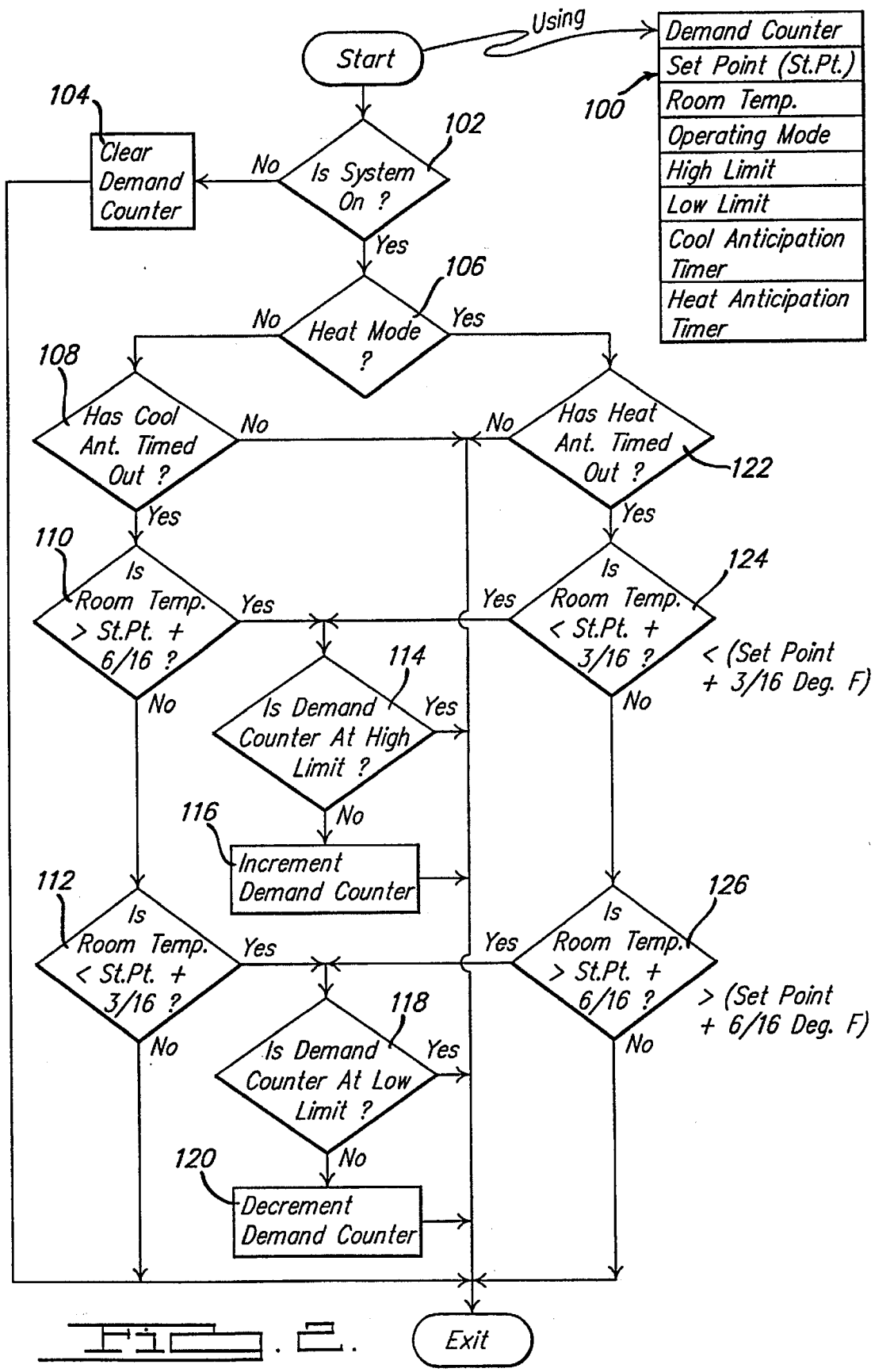
FIG. 2 is a flowchart showing the compressor capacity "demand counter" procedure.

FIG. 2 shows the demand counter procedure. In FIG. 2 the data structure for the demand counter procedure is depicted diagrammatically at 100. The data structure includes a demand counter (used to keep a running tally of the system demand), a setpoint variable (indicating the desired temperature set by the occupant), a room temperature variable (supplied by indoor temperature sensor 60), an operating mode flag (indicating whether the system is in HEATING or COOLING mode), high and low limits and cooling and heating timer variables (used in the internal operation of the procedure).

The demand counter is updated according to the procedure illustrated in FIG. 2. Beginning at 102 the system checks to see if it is on. If not, then the demand counter is cleared at 104. If the system is on, control proceeds to step 106 where the operating mode is tested. The current operating mode can be one of the variables that comprises data structure 100. If the system is in the COOLING mode (i.e., not in the HEATING mode), control branches to step 108. Conversely, if the system is operating in HEATING mode, control branches to step 122. Steps 108 and 122 have a similar purpose. These steps prevent the system from repeatedly cycling on and off, by introducing a predetermined historesis. Data structure 100 includes a cooling anticipation timer value and a heating anticipation timer value. These values represent a predetermined number of seconds of system delay. In the presently preferred embodiment each timer value increment corresponds to six seconds of system delay. As illustrated, different values can be used for HEATING mode and COOLING mode. The presently preferred embodiment initializes both of these timers to produce a delay of approximately one and one-half minutes. The timer values can be changed by the system installer in the field, if required. Whether operating in COOLING mode or HEATING mode, control does not branch past steps 108 and 122 until the requisite anticipation time has elapsed.

Assuming operation in the COOLING mode, once the anticipation time has elapsed, control proceeds to step 110 where the room temperature is compared with the setpoint temperature. The room temperature is measured by temperature sensor 60 and is supplied to data structure 100 by room control unit 45. The setpoint temperature is established by the building occupant through setting the thermostat. The setpoint value is stored in data structure 100, as well. If the room temperature is greater than the setpoint temperature at step 110, then additional demand for cooling is indicated. Note that step 110 requires the room temperature to be greater than the setpoint temperature by a first predetermined amount ($5/16°$ F. in the preferred embodiment). If the room temperature is not greater than the setpoint temperature by the first difference, then control branches to step 112 where a similar test is performed using a second amount ($3/16°$ F. in the preferred embodiment).

If the room temperature is greater than the setpoint temperature plus the first amount (step 110), then control branches to step 114. At step 114 the demand counter is interrogated. If it is not already at its high limit, then the demand counter is incremented at step 116. The high limit is another value stored in data structure 100.

In a similar fashion, if the room temperature is less than the setpoint temperature plus the second amount, then control branches to step 118. In step 118 if the demand counter is not already at its low limit, then control proceeds to step 120, where the demand counter is decremented. The low limit value is also stored in data structure 100.

If the system is operating in the HEATING mode at step 106, control branches through step 122 to step 124, once the heat anticipation timer has elapsed. Step 124 is another entry point to step 114 that occurs if the room temperature is less than the setpoint temperature plus the second amount ($3/16°$ F. in the preferred embodiment). Step 126 is a second entry point to step 118 that is executed if the room temperature is greater than the setpoint temperature plus the first amount ($5/16°$ F. in the preferred embodiment).

Figure 3:
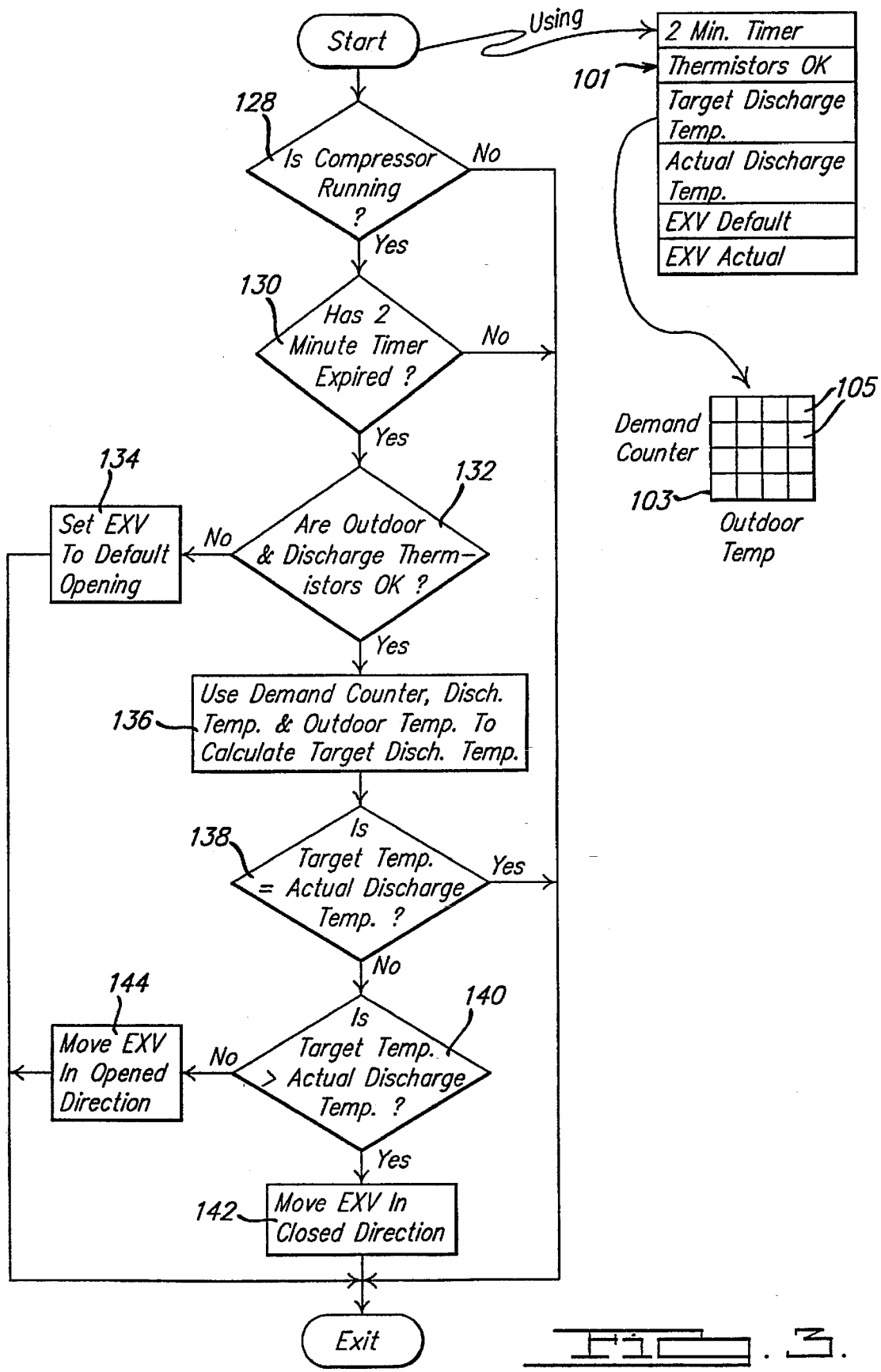
FIG. 3 is a flowchart showing the expansion valve control procedure and its associated data structures.

The demand counter value plays a role in how the expansion valve 42 and compressor 38 are operated. Referring to FIG. 3, the expansion valve control procedure is illustrated. The control procedure uses data structure 101 and the associated lookup table data structure 103. Data structure 101 includes a two minute timer, thermistor malfunction flags, actual discharge temperature value (as read by temperature sensor 54) as well as the actual and default settings for the expansion valve 42. In addition, data structure 101 includes a target discharge temperature variable or pointer that is used to store the desired or target compressor discharge temperature. The target discharge temperature can be derived from a lookup table, such as table 103 which supplies different target discharge temperature values 105 for different demand counter and outdoor air temperature values.

The expansion valve control procedure begins at step 128 by testing whether the compressor is running. If not, then the expansion valve control procedure simply terminates. If the compressor is running, then control branches to step 130 where a two minute delay is performed by counting down the two minute timer of data structure 101, once the two minute time has elapsed, control proceeds to step 132 where the integrity of the thermistors are checked. This may be performed by the processor at this stage, by evaluating whether the thermistors are providing temperature data within valid ranges. Alternatively, the integrity of the thermistors may be determined in advance, with flags set in data structure 101 to indicate whether the thermistors are malfunctioning. By determining the integrity of the thermistors in advance, the procedure can take into account not only whether the thermistors are currently within range, but also whether there is a past history of the thermistors being out of range. If the thermistors are found to have malfunctioned, then the expansion valve is simply set to a default opening at step 134. The default opening can be stored in data structure 101, hence step 134 can be accomplished by simply copying the default data value to the desired or actual expansion valve setting.

Assuming the thermistors are not malfunctioning, then control proceeds to step 136 where the demand counter and outdoor air temperature are used to access lookup table 103 to obtain the target discharge temperature 105. The values stored in lookup table 105 are empirically determined by operating the system under controlled conditions during design. Essentially, the designer selects the target discharge temperature 105 that will achieve optimal efficiency and performance for the particular outdoor temperature and demand counter setting involved. In this regard, the demand counter settings reflect the load on the system, which is in turn a function of the thermostat setting and the indoor air temperature. These can be readily controlled during calibration of the lookup table.

Although a lookup table is presently preferred, computational procedures can be used instead. For example, a first order (linear) equation can be empirically determined to yield the target discharge temperature for the demand counter and outdoor temperature settings involved. Later in this description, an operating example of the presently preferred embodiment is given. The relationships between system demand, outdoor air temperature and compressor discharge temperature are graphically presented.

After the target discharge temperature has been arrived at, control branches to step 138 where a comparison between the target discharge temperature and the actual discharge temperature is made. If the two are equal, then the expansion valve control procedure simply terminates. If they are not equal, then the expansion valve is moved in the closed direction (step 142) or in the open direction (step 144). Depending on the outcome of comparison step 140.

Figure 4:
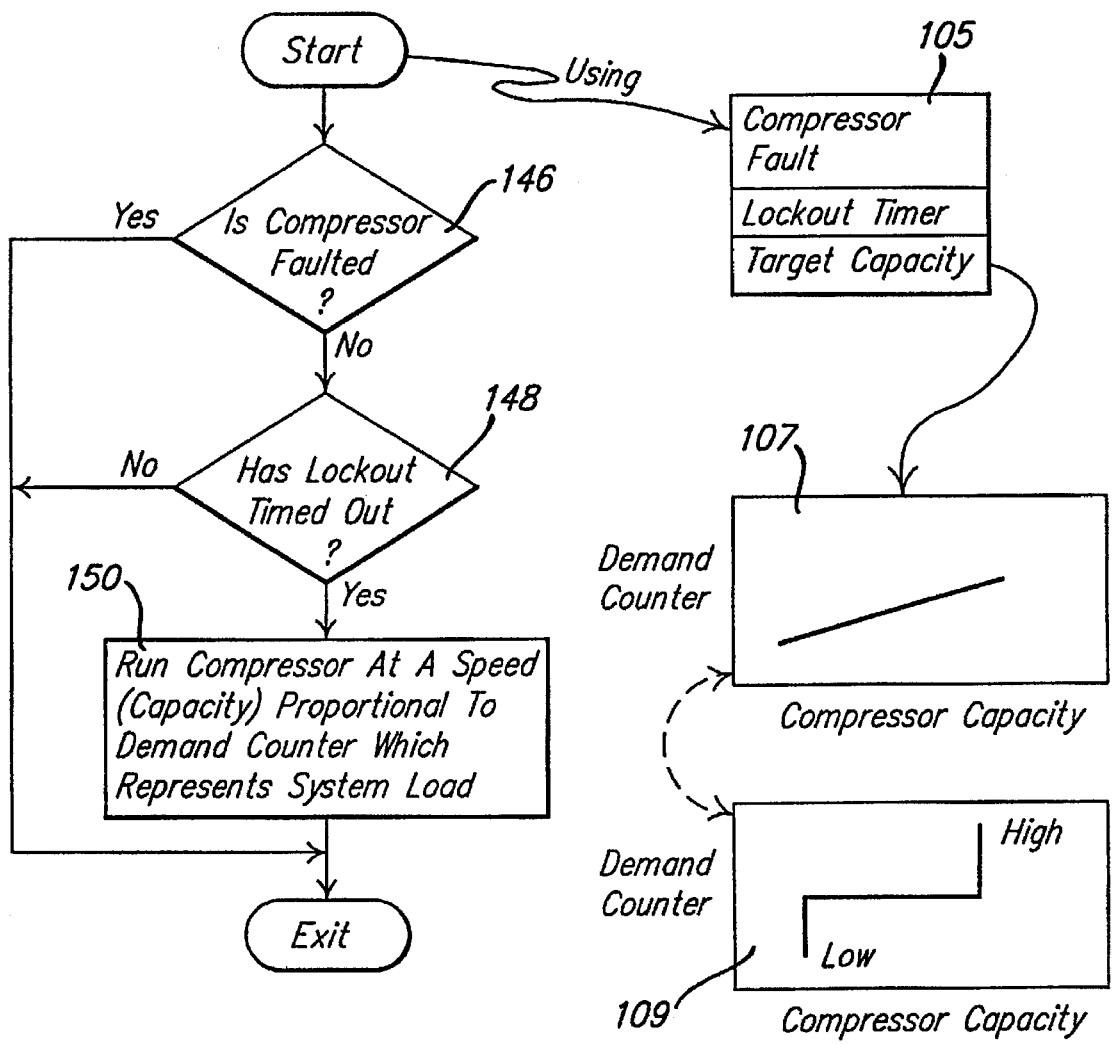
FIG. 4 is a flowchart showing the compressor capacity/speed control procedure and its associated data structures.

The speed or capacity of compressor 42 is controlled by the procedure illustrated in FIG. 4. The procedure of FIG. 4 uses data structure 105, which includes a compressor fault flag, a lockout timer and a variable or pointer indicating the target capacity (e.g., speed) of the compressor. The target capacity may, in turn, be based on a lookup table or computation procedure 107. The lookup table or computational procedure establishes the compressor capacity as a function of the demand counter value.

As illustrated in FIG. 4, the procedure begins by testing the compressor fault flag, step 146. If the compressor is faulted, then the procedure simply terminates. Otherwise, step 148 interrogates the lockout timer. If the timer has not elapsed, then the procedure simply terminates. Once the timer has elapsed, control proceeds to step 150 where the speed of the compressor (or capacity of the compressor) is established using data structure or procedure 107. In FIG. 4 the compressor capacity is shown as a proportional linear function of the demand counter value. The compressor capacity value can be used to control the speed of a variable speed compressor, by controlling the frequency of the AC line current. Alternatively, in a switched capacity system, the demand counter can establish a step function, depicted at 109, that will switch from a low capacity state to a high capacity state at a predetermined demand counter threshold. Naturally, multiple steps may be employed in a system that switches multiple compressors on and off line in tandem.

3. Indoor Fan Control

FIG. 5 shows the indoor fan or blower control strategy graphically. As illustrated, the indoor airflow rate (fan speed) is a function of the compressor capacity. In FIG. 5 indoor airflow rate is shown as a percentage of rated capacity and compressor capacity is shown as a percent of rated capacity. The actual operating capacity of the system is measured by the demand counter procedure illustrated in FIG. 2. Thus the demand counter value stored in data structure 100 can be used as an indication of compressor capacity. The presently prefer red embodiment uses a lookup table or stepwise-linear equation to determine the appropriate indoor airflow rate based on the value of the demand counter.

Table I shows the relationship among the demand counter value, the compressor speed, the compressor capacity, the system capacity, the indoor airflow rate, both as a percent of rated airflow and also in CFM. Table I illustrates the indoor fan control strategy for a three ton variable capacity system, rated at a compressor capacity corresponding to 60 Hertz. The indoor airflow strategy suggested in Table I is applicable to systems with rated capacities other than three ton.

TABLE I

| Demand Counter | Compressor Speed (Hz) | Compressor Capacity (% of rated) | System Capacity (ton) | Indoor Airflow Rate (% of rated) | Indoor Airflow Rate (CFM) |
|---|---|---|---|---|---|
| 200 | 90 | 150 | 4.50 | 100 | 1,200 |
| 133 | 60 | 100 | 3.00 | 100 | 1,200 |
| 100 | 45 | 75 | 2.25 | 80 | 960 |
| 67 | 30 | 60 | 1.50 | 58 | 700 |
| 33 | 15 | 35 | 0.75 | 50 | 600 |

The procedure for controlling the indoor fan is illustrated in the flowchart of FIG. 6. In FIG. 6, the demand counter value is first read at step 152. The outdoor air temperature value is read at step 154 and these two values are used to access a lookup table 160. The value obtained in step 156 by consulting the lookup table 160 is then used to update the indoor fan speed setting at step 158.

4. Charge Detection

Figure 7:
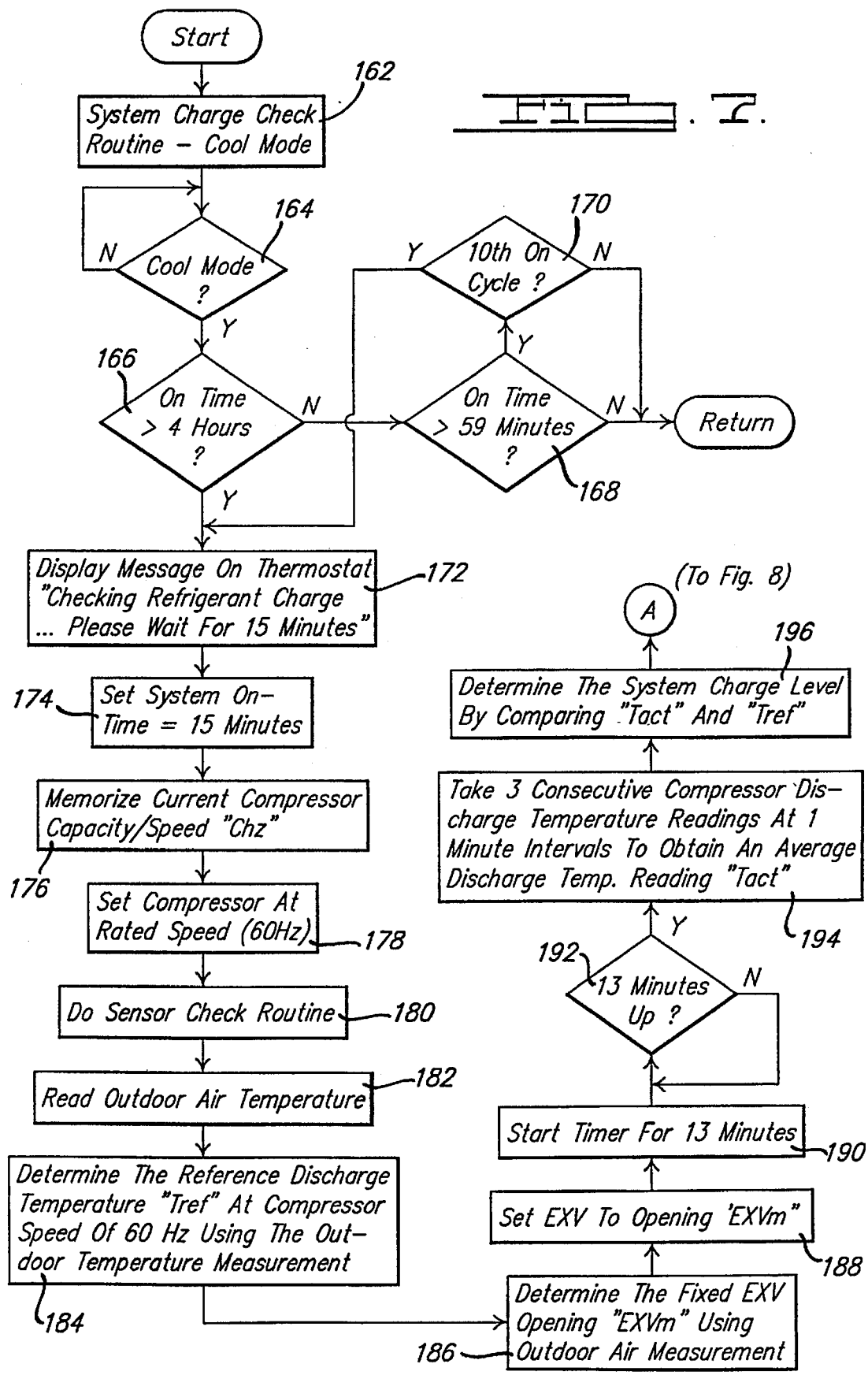
FIGS. 7 and 8 comprise a flowchart illustrating the charge detection diagnostic routine for the cooling mode.
Figure 8:
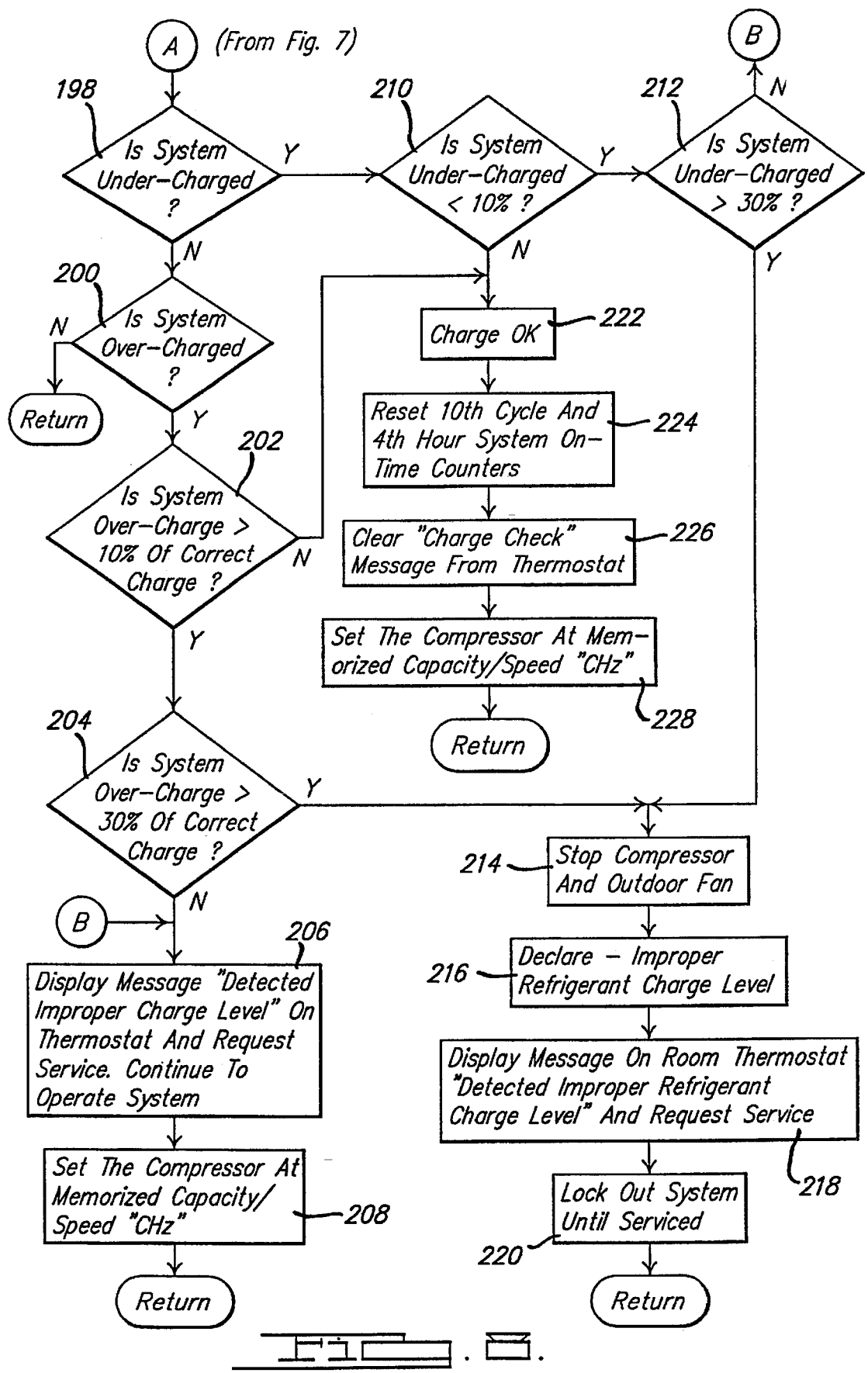
Figure 9:
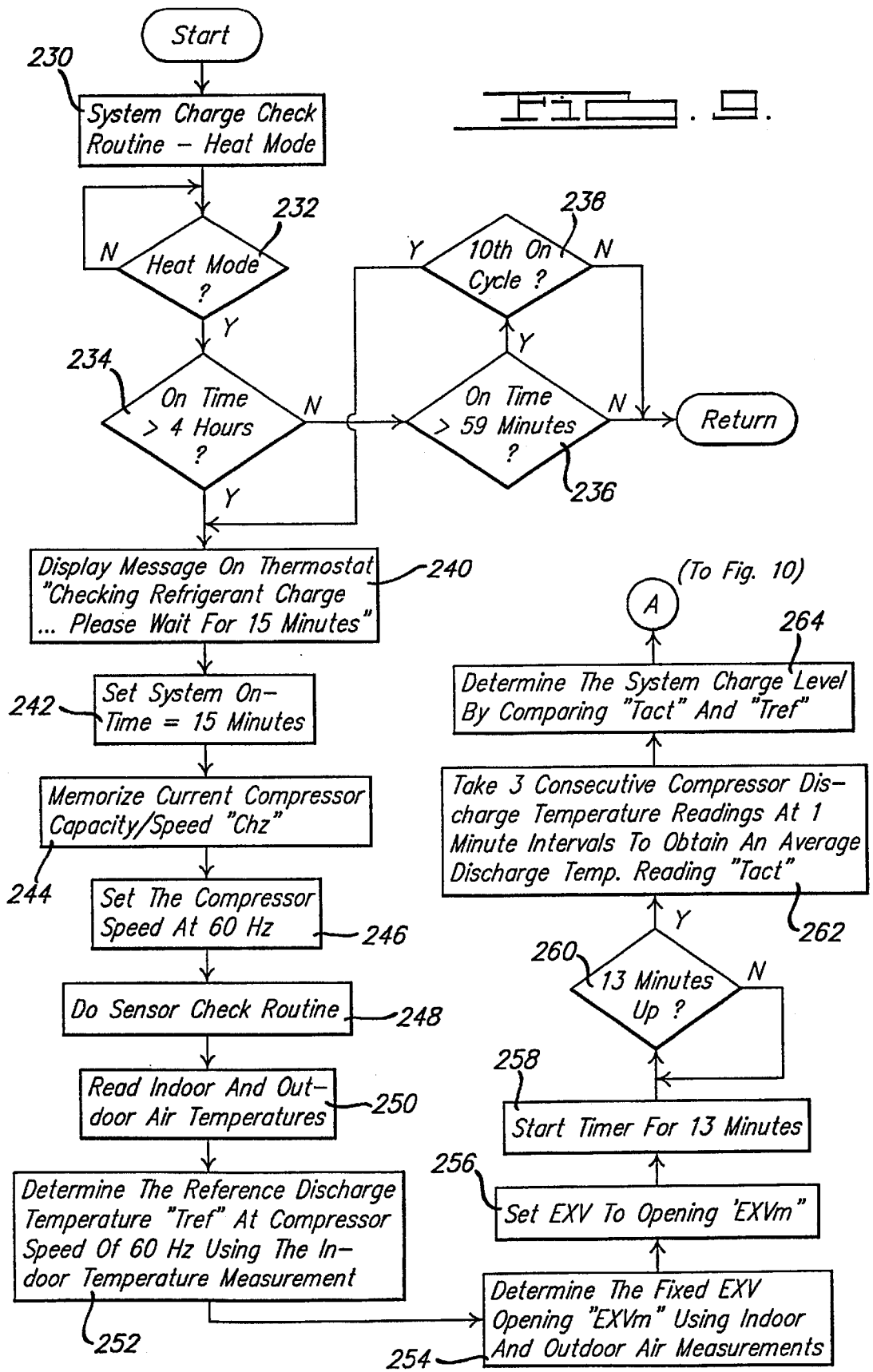
FIGS. 9 and 10 comprise a flowchart illustrating the charge detection diagnostic routine for the heating mode.
Figure 10:
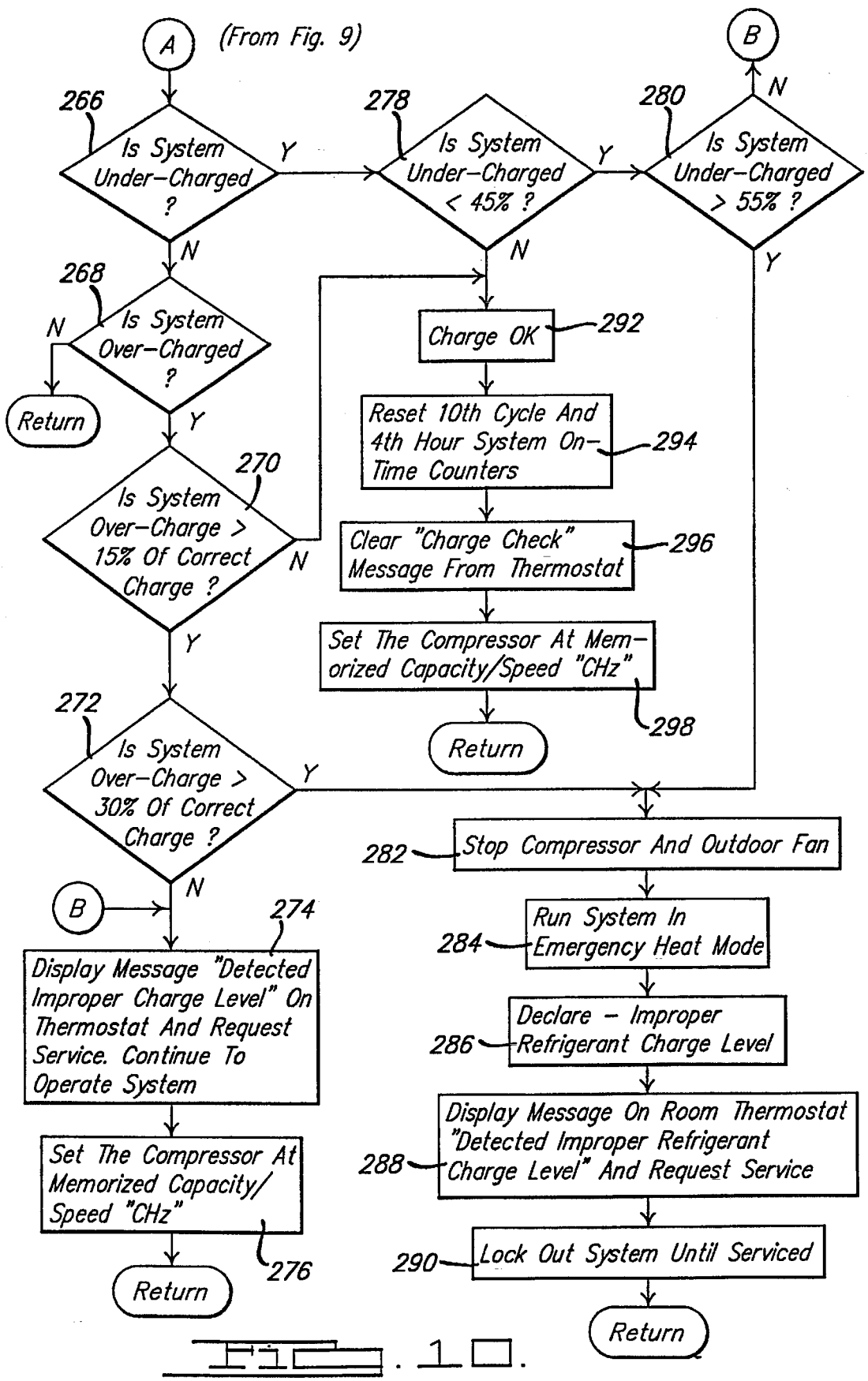

FIGS. 7 and 8 illustrate the procedure for diagnosing whether the system is overcharged or undercharged while operating in the COOLING mode. FIGS. 9 and 10 present similar information when operating in the HEATING mode. The respective procedures for COOLING mode and HEATING mode follow essentially the same logic. The principal difference between COOLING mode and HEATING mode is that in steps 182–186 the outdoor air temperature is used to determine the fixed expansion valve opening in COOLING mode, whereas the indoor and outdoor air temperatures are used to determine the fixed expansion valve opening in HEATING mode. Also, comparing FIGS. 8 and 10, the presently preferred embodiment uses different threshold values for the COOLING mode and HEATING mode is steps 202 versus 270; steps 210 versus 278; and steps 212 versus 280.

Figure 11:
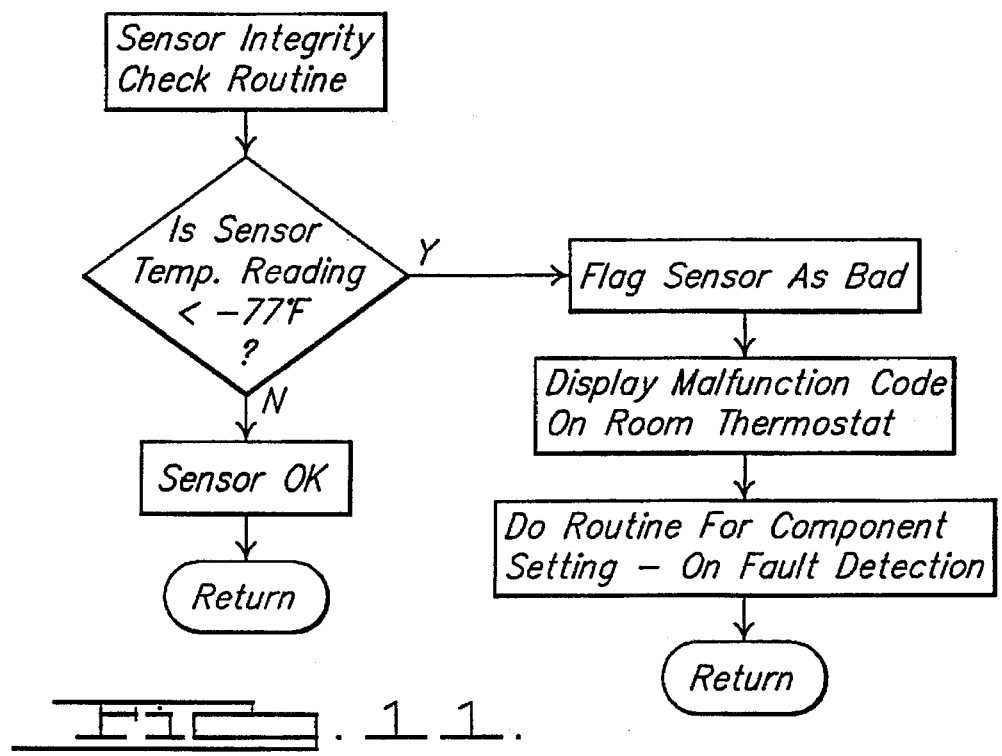
FIG. 11 is a flowchart showing a sensor integrity check routine suitable for use with the invention.

Aside from these differences, the COOLING mode and HEATING mode procedures for charge detection are essentially the same. Both are invoked periodically, once every four hours and once on every tenth cycle per hour. The procedures memorize the current compressor capacity (step 176 of FIG. 7 and step 244 of FIG. 9) and then sets the compressor at its rated speed for the duration of the test (step 178 of FIG. 7 and step 246 of FIG. 9). Since the charge detection procedure relies on temperature sensor readings, the procedure performs a sensor check routine (step 180 of FIG. 7 and step 248 of FIG. 9) before taking its readings. A suitable sensor check routine is illustrated in FIG. 11.

In the alternative, instead of setting the compressor at its rated speed while performing the charge detection routine, the compressor can be operated at the compressor capacity that is dictated by the current load. In this alternative approach, the diagnostic routine compares the discharge temperature to a reference discharge temperature that is a function of compressor capacity. This information may be stored in a lookup table or may be derived from empirical relationship coded in the microprocessor.

Figure 12:
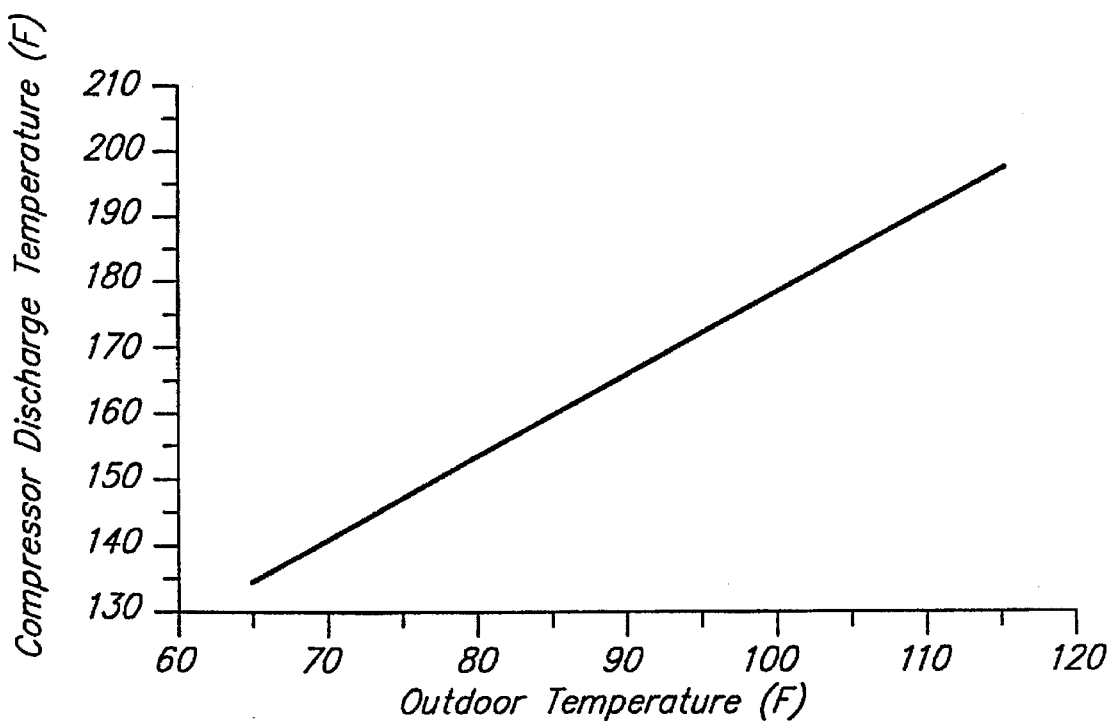
FIG. 12 is a graph showing the relationship between cooling mode discharge temperature setting and outdoor temperature.
Figure 13:
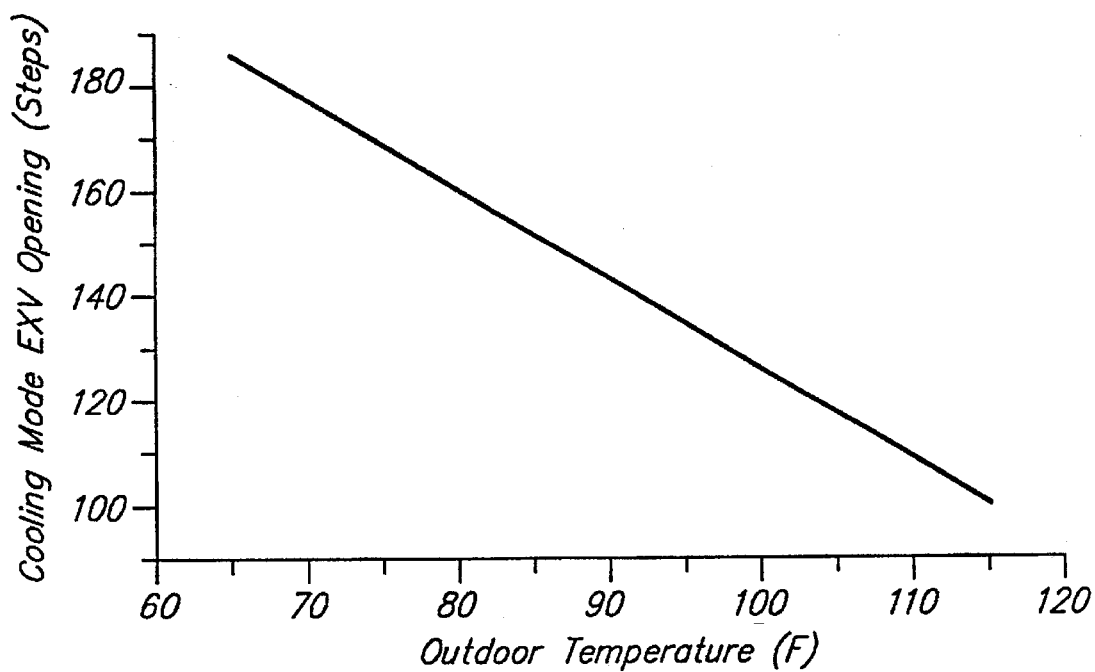
FIG. 13 is a graph showing the relationship between cooling mode expansion valve opening and outdoor temperature.
Figure 14:
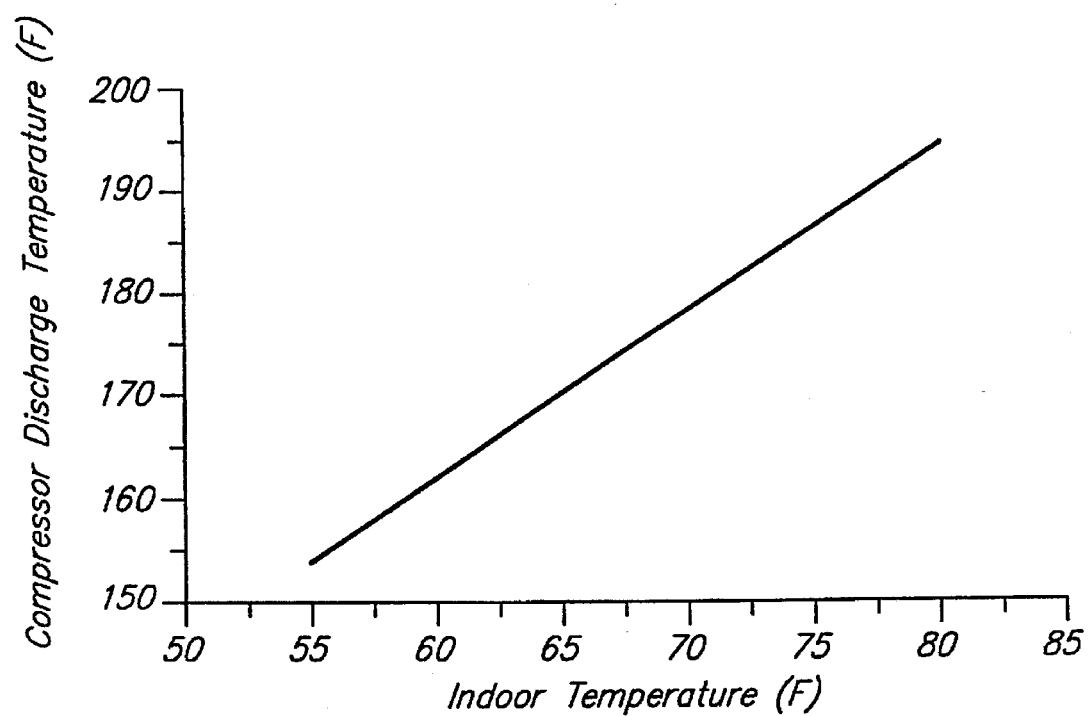
FIG. 14 is a graph showing the relationship between heating mode discharge temperature setting and indoor temperature.
Figure 15:
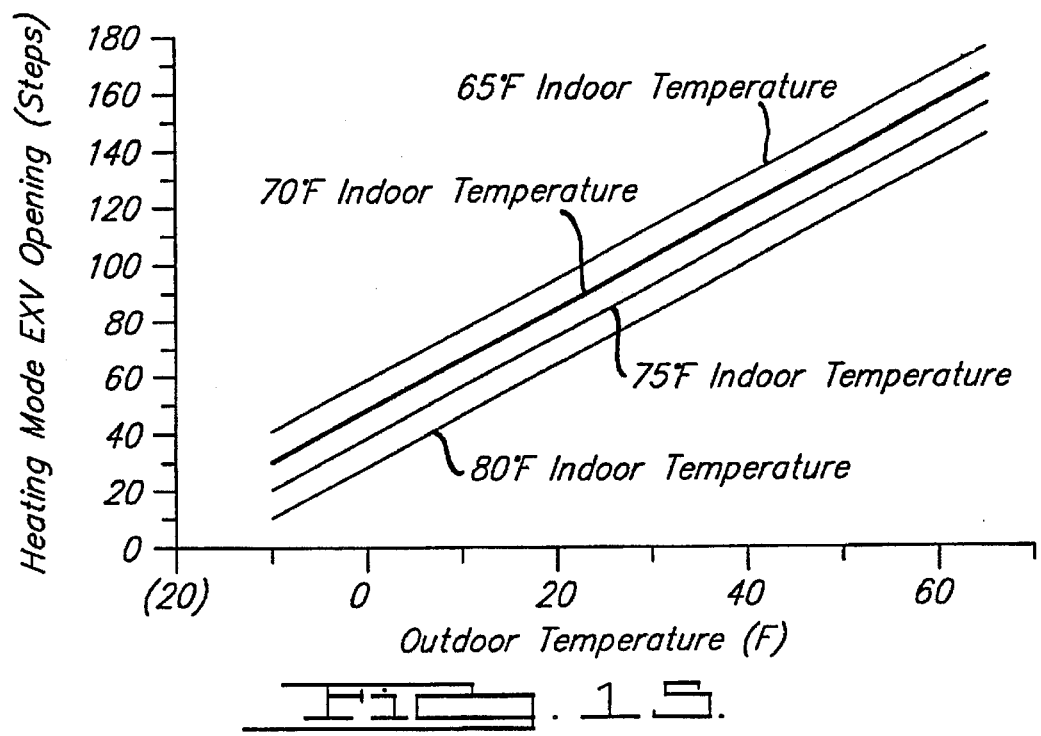
FIG. 15 is a family of graphs showing the relationship between heating mode discharge temperature and refrigerant charge for different indoor temperatures.

After the readings have been taken a reference compressor discharge temperature and a fixed expansion valve opening setting are determined. For the COOLING mode, the reference discharge temperature is determined at step 184, using the relationship of outdoor temperature to compressor discharge temperature illustrated in FIG. 12. The expansion valve opening in the COOLING mode is determined at step 186 according to the information presented in FIG. 13. Similarly, in the HEATING mode, the reference discharge temperature is determined at step 252 using the information reflected in FIG. 14. The expansion valve opening is determined at step 254 using the information reflected in FIG. 15.

Figure 16:
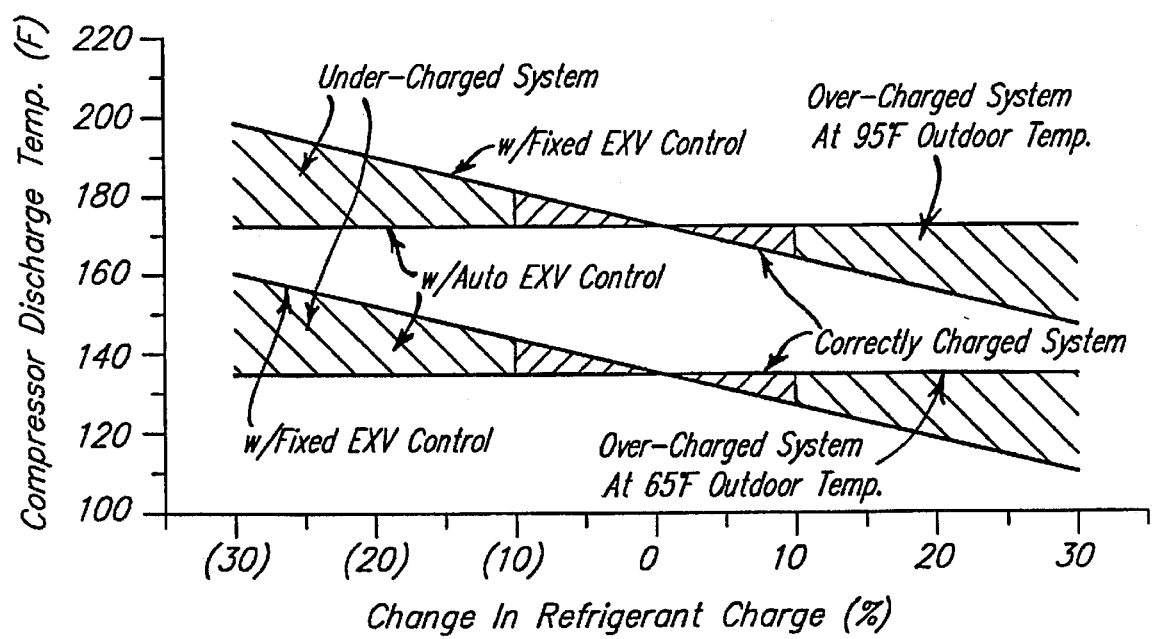
FIG. 16 is a family of graphs showing cooling mode discharge temperature versus refrigerant charge, useful in identifying undercharged, correctly charged and overcharged systems.
Figure 17:
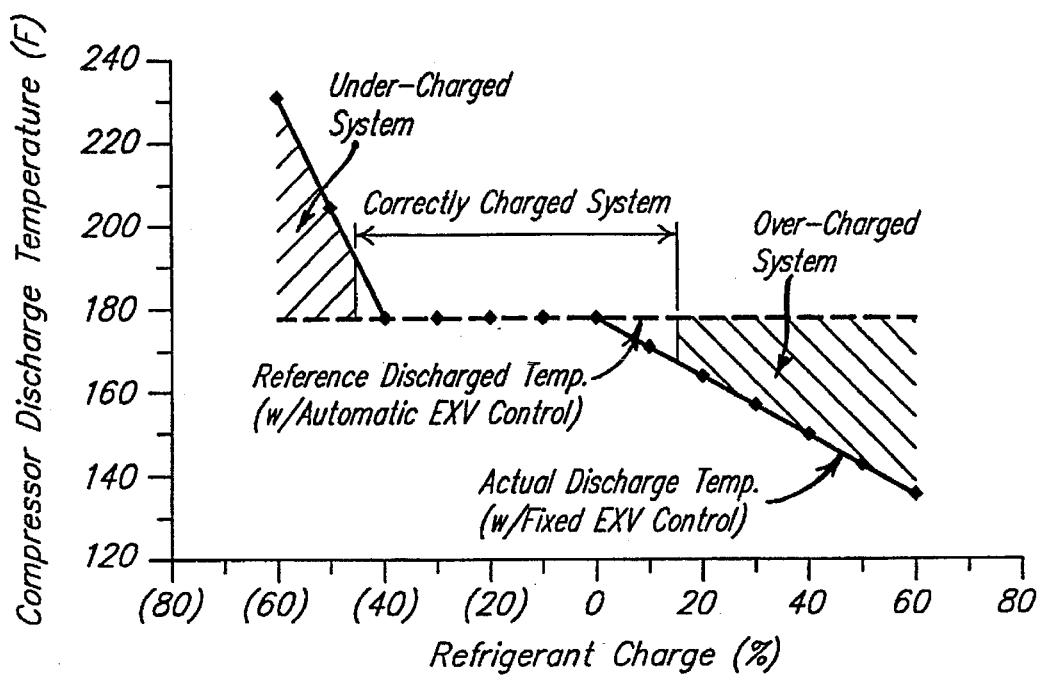
FIG. 17 is a family of graphs showing heating mode discharge temperature versus refrigerant charge, useful in identifying undercharged, correctly charged and overcharged systems.

After the fixed expansion valve opening has been determined, the valve is set to that opening where it is allowed to remain for a predetermined time (13 minutes). Thereafter, three consecutive compressor discharge temperature readings are taken at one minute intervals to obtain an average discharge temperature reading. See step 194 (FIG. 7) for the COOLING mode and step 262 (FIG. 9) for the HEATING mode. Next the system charge level is determined. In the COOLING mode, step 196 determines whether the system is overcharged, correctly charged, or undercharged, using the relationships illustrated in FIG. 16. In the HEATING mode, step 264 performs the same function using the relationships illustrated in FIG. 17.

What action is taken in the case of an overcharged system or an undercharged system depends on the percentage of overcharge or undercharge and on whether the system is operating in COOLING mode or in HEATING mode. FIG. 8 illustrates the response to overcharged, correctly charged and undercharged results for the COOLING mode. FIG. 10 gives similar information for the HEATING mode.

5. System Steady-State Operation

The preferred embodiment uses compressor discharge temperature to control the variable capacity heat pump system. The indoor control unit 46 is programmed with the empirical relationships that provide optimum heat pump performance during both HEATING mode and COOLING mode. Specifically, compressor discharge temperature and outdoor air temperature are used during COOLING mode operation and compressor discharge temperature and indoor air temperature used during HEATING mode operation.

Figure 18:
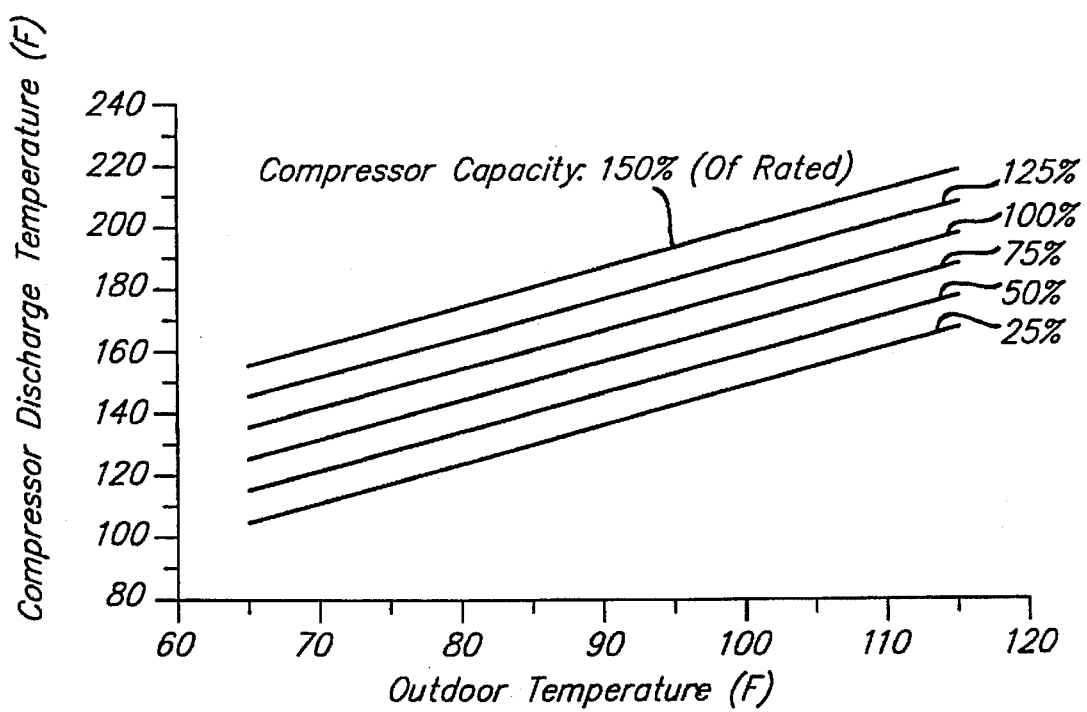
FIG. 18 is a family of graphs showing the relationship between discharge temperature setting and outdoor temperature in the cooling mode for various compressor capacities.
Figure 19:
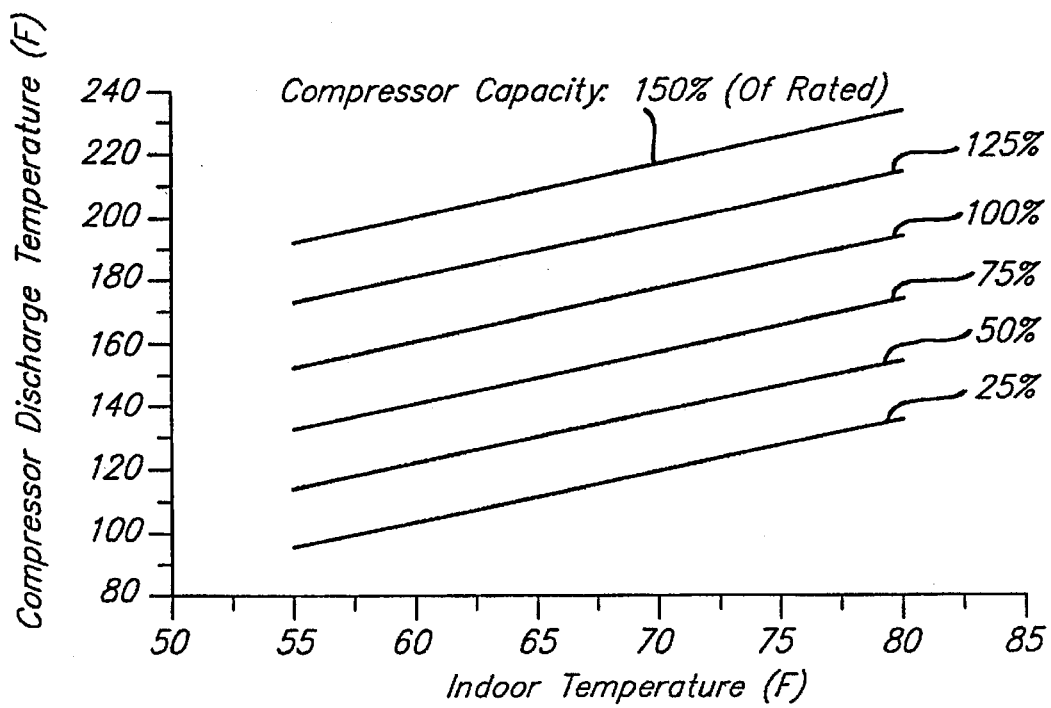
FIG. 19 is a family of graphs showing the relationship between discharge temperature setting and indoor temperature in the heating mode for various compressor capacities.
Figure 22:
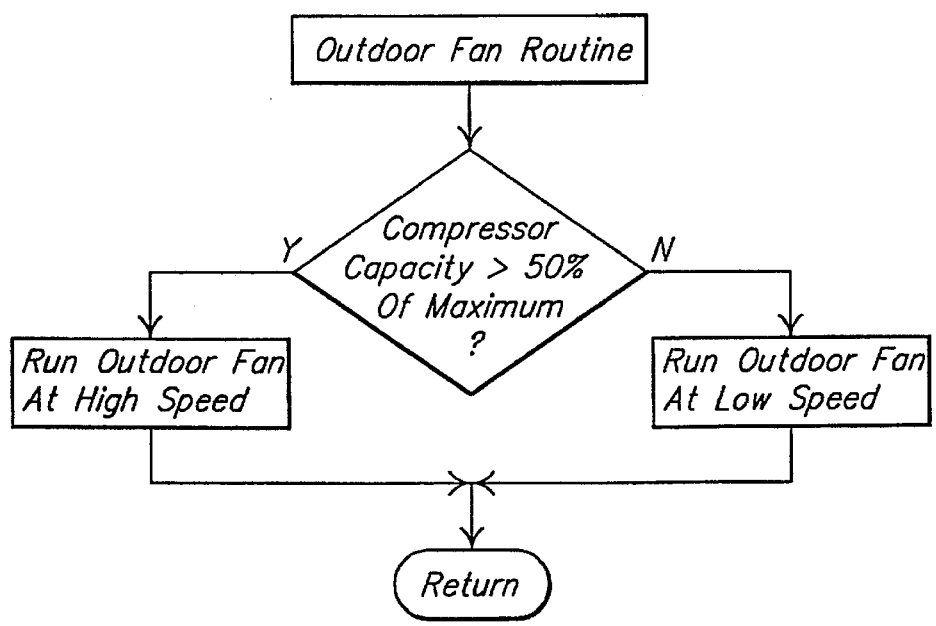
FIG. 22 is a flowchart showing an outdoor fan control procedure for use with the system.
Figure 20A:
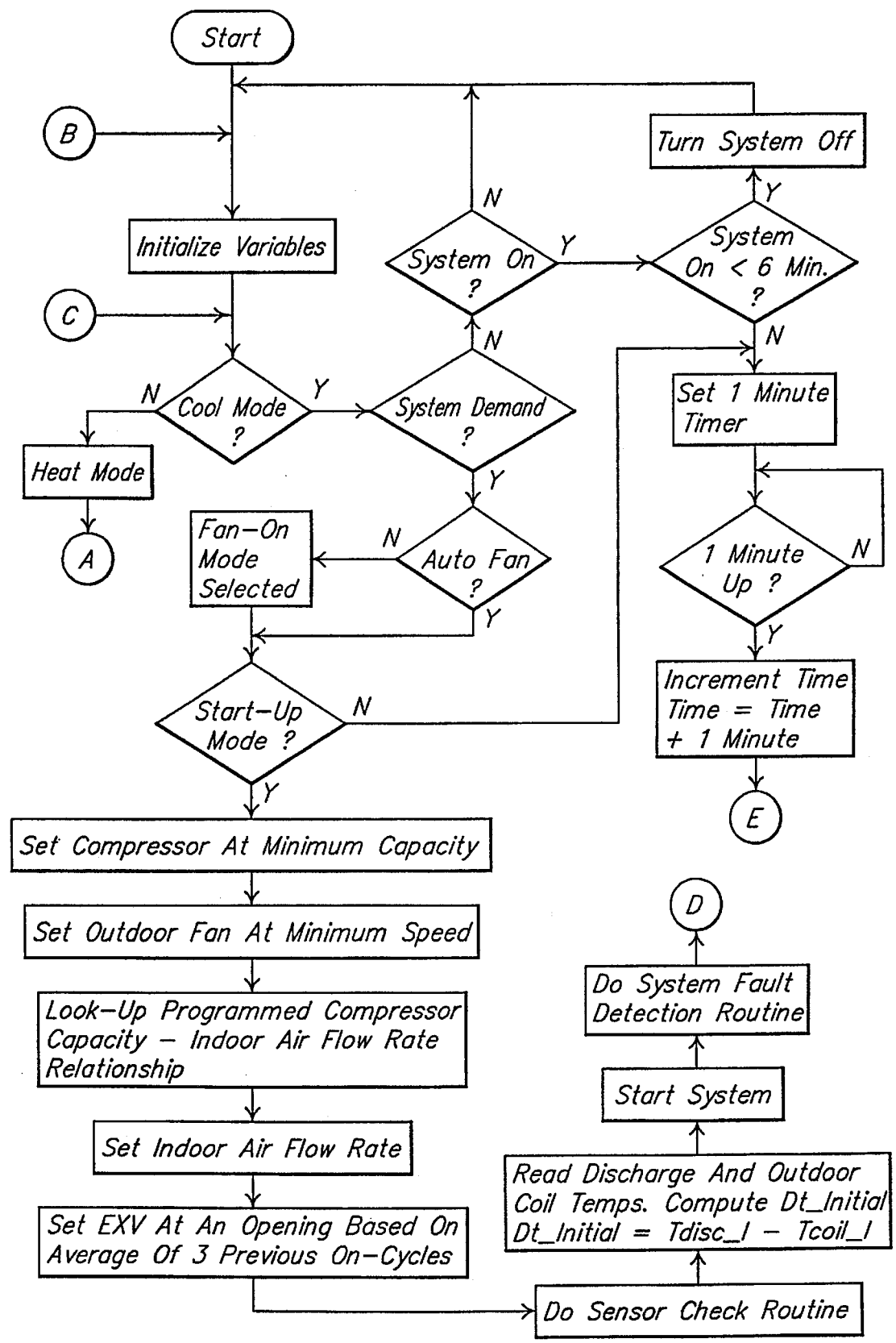
FIGS. 20A–20B (collectively referred to as FIG. 20) comprise steady-state system flowcharts illustrating the operation of the preferred embodiment in cooling mode.
Figure 20B:
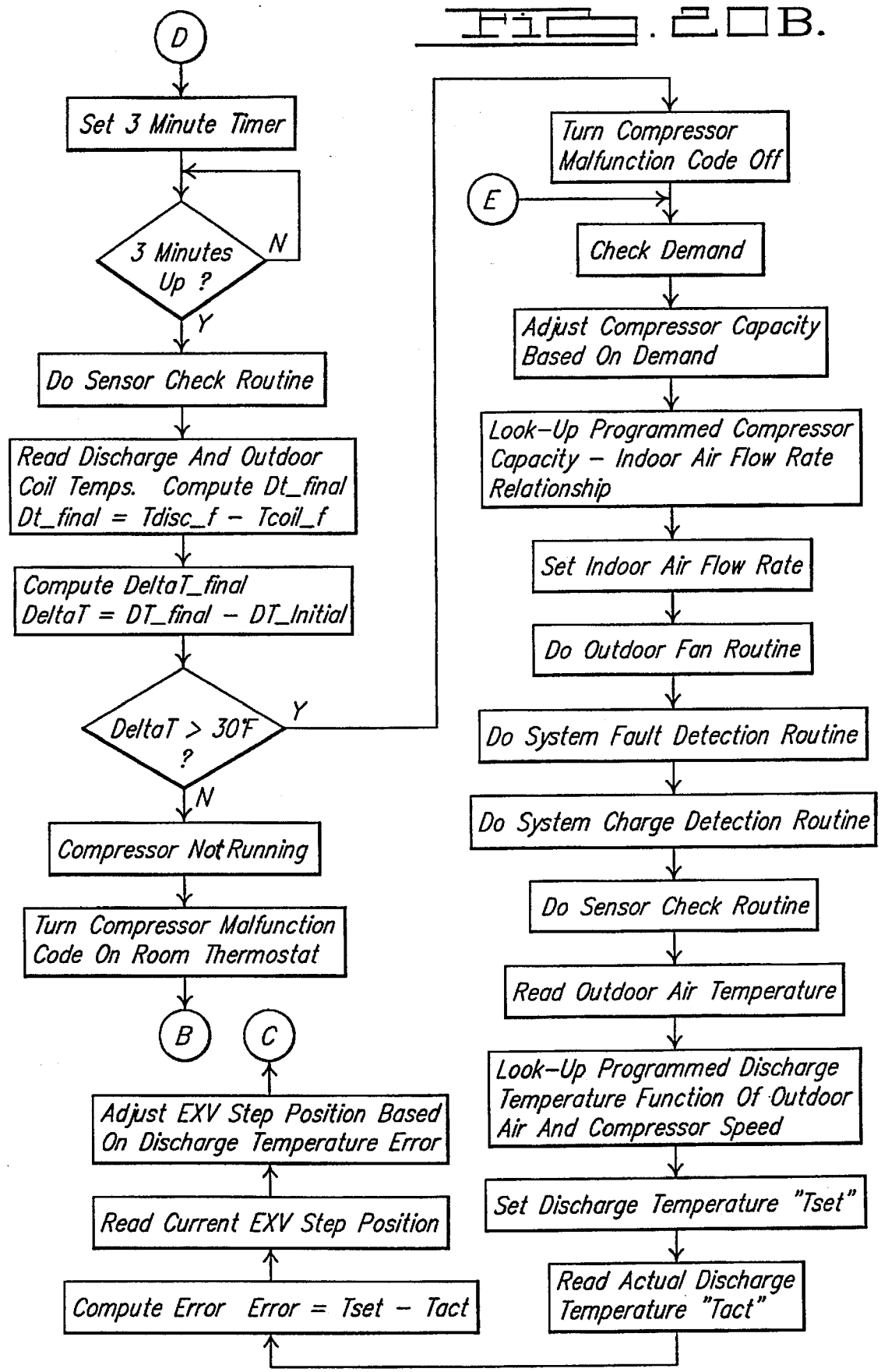
Figure 21A:
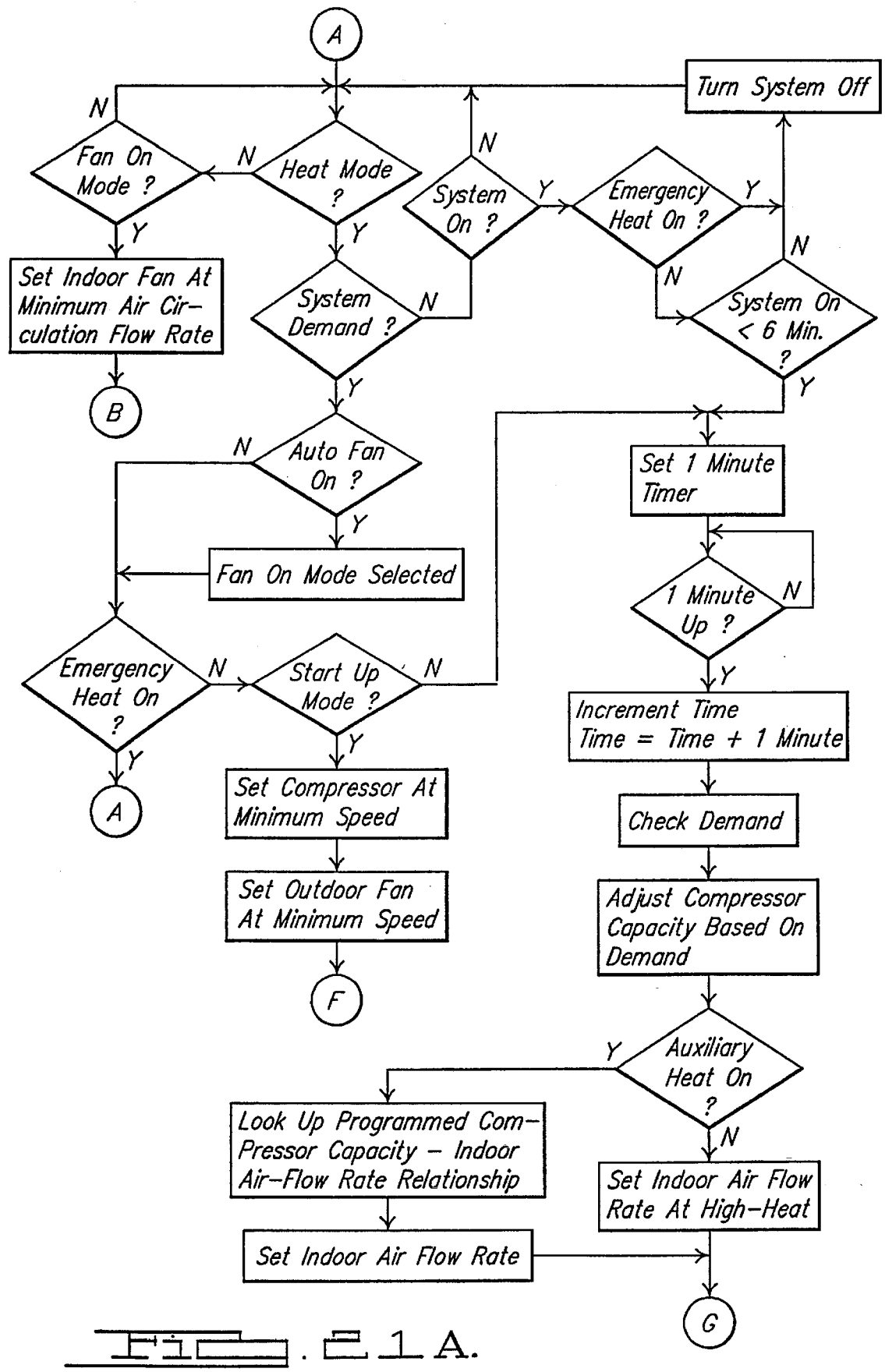
FIGS. 21A–21C (collectively referred to as FIG. 21) comprise steady-state system flowcharts illustrating the operation of the preferred embodiment in heating mode.
Figure 21B:
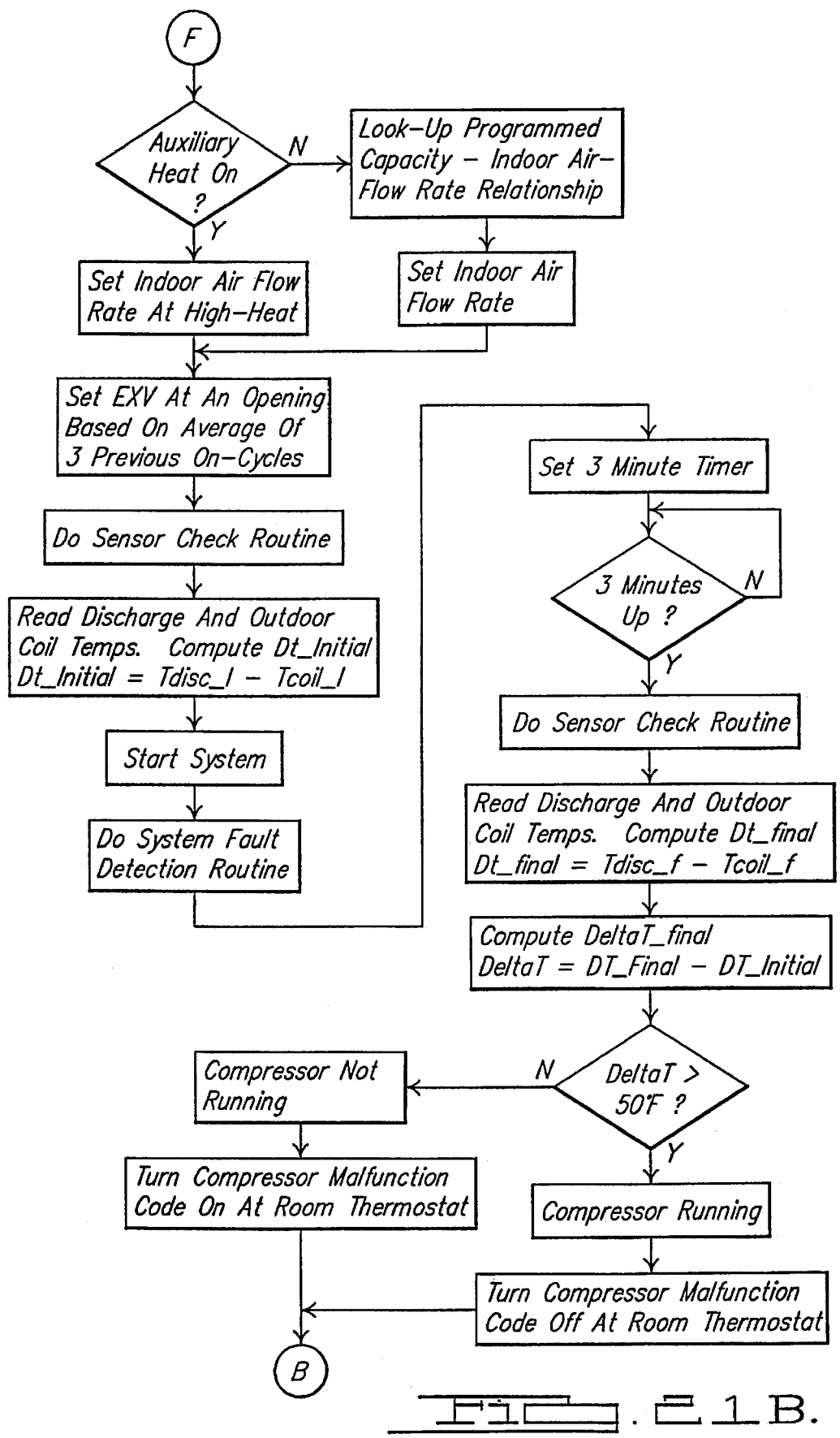
Figure 21C:
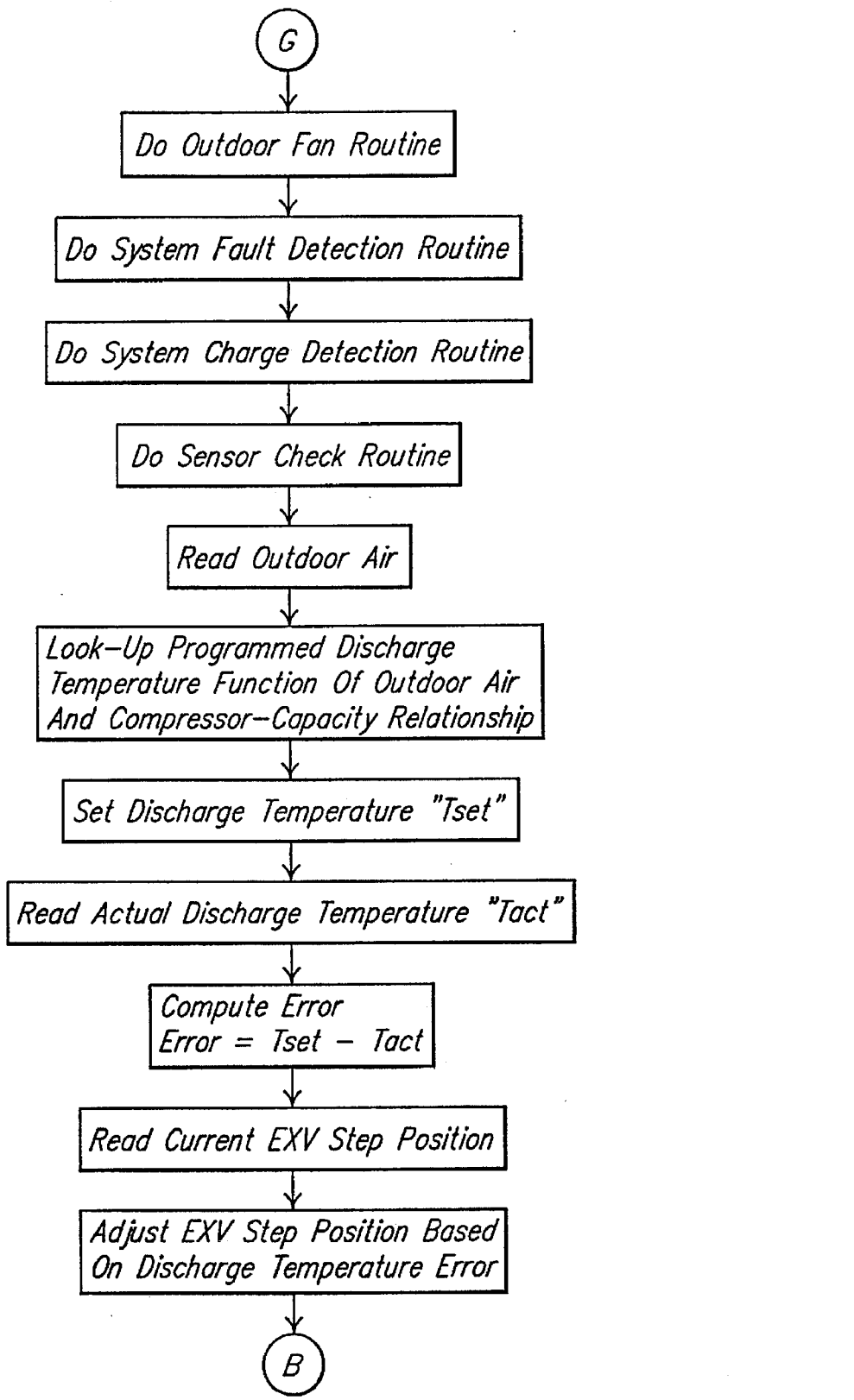

The optimum heating and cooling relationships for various compressor capacities are shown in FIGS. 18 and 19. FIG. 18 pertains to COOLING mode and FIG. 19 pertains to HEATING mode. These discharge temperature settings correspond to the minimum compressor superheat settings that produce the best system performance.

The indoor control unit 46 uses information from indoor temperature sensor 60 and ambient outdoor air temperature sensor 56 along with demand counter information (see FIG. 2) to compute the required heating or cooling compressor capacity. Once the required compressor capacity has been determined, the system logic uses the relationships shown in FIGS. 18 and 19 to set the target compressor discharge temperature and the indoor and outdoor airflow settings for optimum system performance. The preferred embodiment updates the expansion valve setting every minute to maintain the target discharge temperature. The change in number of expansion valve stepper motor steps required to achieve the target discharge temperature setting depends on the error ($\Delta T$) between the target and the actual discharge temperatures. The preferred system is configured to make rapid step changes in the expansion valve, based on error ($\Delta T$), if needed. The flowcharts of FIGS. 20–23 provide a detailed illustration of the steady-state cooling (FIGS. 20–21) and heating (FIGS. 22–23) system control logistics. FIG. 24 illustrates the control routine for operating the outdoor fan 34. Note that the outdoor fan is switched between high speed and low speed depending on the compressor capacity.

The foregoing has illustrated the presently preferred embodiment of the invention in detail. Although the preferred embodiment has been illustrated, it will be understood that the illustrated configuration can be modified without departing from the spirit of the invention as set forth in the appended claims.

What is claimed is:

1. A control system for a heat pump system of the type having a compressor for discharging refrigerant through an electrically controlled valve into a heat exchanger, comprising:
   a first sensor for sensing a first parameter indicative of the temperature of the refrigerant discharged from said compressor;
   a second sensor for sensing a second parameter indicative of the ambient air temperature;
   a third sensor for sensing a third parameter indicative of the thermal load on said heat pump system;
   at least one control system processor coupled for communication with said first, second and third sensors and with said valve for controlling the quantity of refrigerant discharged into said heat exchanger based on said first, second and third parameters.

2. The control system of claim 1 wherein said heat pump system is of the type having an indoor heat exchanger and an outdoor heat exchanger and wherein said second sensor senses a second parameter indicative of the ambient air in proximity to said outdoor heat exchanger.

3. The control system of claim 1 wherein said third sensor comprises:
   a room temperature sensor for sensing a quantity indicative of room temperature;
   a means for establishing a desired temperature setpoint;
   a demand counter for accumulating a value indicative of thermal load; and
   a load determining system for comparing said room temperature with said desired temperature setpoint and for altering the value accumulated by said demand counter based on said comparison.

4. The control system of claim 3 wherein said load determining system (a) increases the accumulated value if the room temperature is greater than the desired temperature setpoint; and (b) decreases the accumulated value if the room temperature is less than the desired temperature setpoint.

5. The control system of claim 1 further comprising variable capacity compressor system and compressor control system coupled for communication with said third sensor for controlling the capacity of said compressor based on said thermal load.

6. The control system of claim 5 wherein said variable capacity compressor system comprises a variable speed compressor and wherein said compressor control system varies the speed of the compressor based on said thermal load.

7. The control system of claim 6 wherein said variable speed compressor has a plurality of discretely selectable speeds.

8. The control system of claim 6 wherein said variable speed compressor has a continuously variable range of speeds.

9. The control system of claim 5 wherein said variable capacity compressor system comprises a plurality of compressors selectively operable in tandem and wherein said compressor control system selectively operates said plurality of compressors to vary the capacity of the variable capacity compressor system based on said thermal load.

* * * * *

UNITED STATES PATENT AND TRADEMARK OFFICE
CERTIFICATE OF CORRECTION

Page 1 of 2

PATENT NO. : 5,628,201
DATED : May 13, 1997
INVENTOR(S) : Vijay Bahel; Hank Millet; Mickey Hickey; Hung Pham; Gregory P. Herroon; Gerald L. Greschl It is certified that error appears in the above-indentified patent and that said Letters Patent is hereby corrected as shown below:

On the Title Page, under U.S. Patent Documents, reference 2,978,879 "6/1961" should be -- 4/1961 --.

On the Title Page, under U.S. Patent Documents, reference 3,047,696 "12/1962" should be -- 7/1962 --.

On the Title Page, under Other Publications, line 1, "Heart" should be -- Heat --.

Column 1, line 49, "Applicant's" should be -- Applicants' --.

Column 1, line 51, "Applicant's" should be "Applicants'".

Column 4, line 25, "coup led" should be -- coupled --.

Column 4, line 27, after "sensor" insert "62".

Column 7, lines 14 & 15, ". Depending" should be -- , depending --.

UNITED STATES PATENT AND TRADEMARK OFFICE
CERTIFICATE OF CORRECTION

PATENT NO. : 5,628,201
DATED : May 13, 1997
INVENTOR(S) : Vijay Bahel; Hank Millet; Mickey Hickey; Hung Pham; Gregory P. Herroon; Gerald L. Greschl It is certified that error appears in the above-identified patent and that said Letters Patent is hereby corrected as shown below:

Column 7, line 56, "prefer red" should be "preferred".

Signed and Sealed this

Thirteenth Day of January, 1998

Attest:

BRUCE LEHMAN

*Attesting Officer*  *Commissioner of Patents and Trademarks*